United States Patent [19]
Reeve

[11] 3,986,923
[45] Oct. 19, 1976

[54] REMOVAL OF DISSOLVED SALTS FROM SULPHIDE LIQUORS

[75] Inventor: Douglas W. Reeve, Orton, Canada

[73] Assignee: Erco Envirotech Ltd., Islington, Canada

[22] Filed: Aug. 5, 1974

[21] Appl. No.: 494,898

[30] Foreign Application Priority Data
Aug. 7, 1973 United Kingdom............... 37413/73

[52] U.S. Cl.................................... 162/17; 162/19; 162/30 K; 162/DIG. 8; 23/296; 23/303; 423/207; 423/499
[51] Int. Cl.².................... D21C 3/02; D21C 11/04
[58] Field of Search................. 162/17, 30, DIG. 8, 162/29, 19, 88, 89; 23/296, 297, 303; 423/207, 184, 499

[56] References Cited
UNITED STATES PATENTS

| | | | |
|---|---|---|---|
| 1,906,886 | 5/1933 | Richter | 162/30 |
| 3,698,995 | 10/1972 | Rapson | 162/30 |
| 3,746,612 | 7/1973 | Rapson et al. | 162/30 |
| 3,909,344 | 9/1975 | Lukes | 162/19 |
| 3,945,880 | 3/1976 | Lukes et al. | 162/17 |

FOREIGN PATENTS OR APPLICATIONS

| | | | |
|---|---|---|---|
| 928,008 | 6/1973 | Canada | 162/29 |
| 2,159,935 | 6/1973 | France | 162/DIG. 8 |

Primary Examiner—S. Leon Bashore
Assistant Examiner—Peter F. Kratz
Attorney, Agent, or Firm—Sim & McBurney

[57] ABSTRACT

Sodium chloride is removed from Kraft mill smelts by fractionating the smelt to separate sodium carbonate and sodium sulphate in solid form from sodium sulphide and sodium chloride which usually is contaminated with residual quantities of sodium carbonate and sodium sulphate and is contained in an aqueous solution thereof. Sodium chloride subsequently is separated from the aqueous solution. Various fractionation procedures are described and various procedures for the removal of the sodium chloride in substantially pure form also are described.

51 Claims, 12 Drawing Figures

REMOVAL OF DISSOLVED SALTS FROM SULPHIDE LIQUORS

FIELD OF INVENTION

The present invention relates to the removal of dissolved salts, typically sodium chloride, from sulphide liquors, typically aqueous sodium sulphide solutions formed in pulp mill recovery and regeneration operations.

BACKGROUND OF THE INVENTION

Generally in the production of pulp suitable for formation into paper, wood or other raw cellulosic fibrous material, is subjected to chemical digestion in a pulping liquor to form a pulp of the cellulosic fibrous material. In the present invention, the pulping liquor contains or consists of sodium sulphide. The pulp thereafter is subjected to brightening and purification operations in a bleach plant.

The spent pulping liquor from the digestion usually is subjected to a series of recovery and regeneration operations to recover unused pulping chemicals and to provide fresh pulping liquor.

A widely used pulping process is the Kraft process. While the present invention will be described hereinafter with particular reference to Kraft mills, the process of the invention also is applicable to other pulp mill operations which utilize sodium sulphide or in which aqueous sodium sulphide is produced as an intermediate product. Typical of such additional processes are high yield pretreatment Kraft, polysulfide, alkafide and sodium-based sulphite processes. In the conventional Kraft process, raw cellulosic fibrous material, generally wood chips, is digested, by heating, in a pulping liquor, known as white liquor and containing sodium sulphide and sodium hydroxide as the active pulping chemicals to provide a pulp and spent pulping liquor, known as black liquor. The black liquor is separated from the pulp by washing in a brown stock washer and the pulp then is passed to the bleach plant for brightening and purification operations.

The black liquor then is passed to the recovery and regeneration system in which the black liquor first is concentrated, usually by evaporation, and the concentrated black liquor is burned in a furnace to yield a smelt containing sodium carbonate and sodium sulphide. A sodium-and sulphur-containing compound, generally sodium sulphate, is added to the black liquor generally prior to feed of the concentrated black liquor to the furnace, although such sodium- and sulphur-containing compounds may be added at any other convenient location, such as to the white liquor prior to the digestion step, to make up sodium and sulphur values lost from the recovery system.

The smelt is dissolved in water to yield a raw green liquor which then is clarified to remove undissolved solids. The clarified green liquor, containing dissolved quantities of sodium carbonate and sodium sulphide, is causticized with slaked lime whereby the sodium carbonate is converted to sodium hydroxide and calcium carbonate mud. The resulting liquor is white liquor which then may be recycled to the digestion step to provide at least part of the pulping liquor.

Bleach plant operations generally involve a sequence of brightening and purification steps, together with washing steps. The brightening steps involve the use of bleaching agents, and in the present invention, at least one of the brightening steps preferably involves the use of at least one chlorine-containing bleaching agent. Such chlorine-containing bleaching agents include chlorine, chlorine dioxide, chlorine monoxide and sodium hypochlorite.

The purification step generally involves treatment with a sodium hydroxide solution, and usually is known as a caustic extraction step. In some instances, the bleaching and caustic extraction steps may be combined, for example, using the so-called "oxygen bleaching" operation. Where oxygen bleaching is used, however, it is used in this invention preferably in combination with one or more bleaching operations using chlorine-containing bleaching chemicals.

A particular bleaching operation which has been employed involves an initial bleaching of the pulp with an aqueous solution containing chlorine or a mixture of chlorine dioxide and chlorine, an intermediate washing, a caustic extraction using aqueous sodium hydroxide solution, a further washing, a bleaching with an aqueous solution of chlorine dioxide, another washing, a further caustic extraction using sodium hydroxide, an additional washing, a final bleaching with chlorine dioxide solution and a final washing. This is the so-called CEDED operation. The present invention will be described with particular reference to this procedure, although other procedures may be employed, such as, the use of an aqueous solution containing approximately 100% chlorine dioxide in the first bleaching step.

The above-described CEDED operation may be carried out using the so-called "Dynamic Bleaching" process claimed in Canadian Pat. No. 783,483. In this process, pulp treating solutions are passed successively through a mat of fibers in which the fibers are maintained relatively stationary with respect to each other. Washing steps, except for a washing after the last step of the bleaching and purification sequence may be omitted.

The spent wash waters from bleach plants generally have been discharged to water bodies, such as streams, rivers, lakes and oceans, without any attempt to recover chemicals therefrom, although in some instances solid particle recovery operations have been made. One of the main reasons that no attempt has been made to recover these chemicals is because they are very dilute and of small value. The bleach plant also produces spent bleaching liquor and spent caustic extraction effluents. These effluents have objectionable colour and are toxic and harmful to aquatic and marine biota and polluting since they contain fibers and materials consuming oxygen present in the water. It is desirable to avoid such environmental pollution and hence avoid the discharge of these effluents from the mill.

Due to the use of chlorine-containing bleaching chemicals and sodium-containing purification agents, the spent wash water contains substantial quantities of sodium chloride. In addition, when the spent bleaching liquor effluents and the spent caustic extraction liquor effluents are mixed at least part of the residual chlorine and soda values combine to form sodium chloride. In the present invention, the normally discharged effluents, namely, the spent wash water, the spent bleaching chemicals and the spent caustic extraction liquor preferably are mixed to provide a single bleach plant effluent stream, known as BPE and the bleach plant effluent is not discharged to waste.

The quantity of chlorine-containing bleaching agents and the quantity of sodium hydroxide used as caustic extraction liquor preferably are balanced to provide about one atom of sodium for each atom of chlorine, whereby these chemicals form sodium chloride and thereby to provide a neutral effluent. The equivalence of sodium and chlorine atoms in the bleach plant effluent is preferred so that the overall sodium inventory of the mill thereby remains unchanged. In the CEDED sequence when chlorine or mixtures of chlorine dioxide and chlorine in which the proportions of available chlorine provided by chlorine dioxide is low, is used in the first stage an amount of sodium hydroxide solution in excess of that required for extraction must be added to match the chlorine atoms present. If no excess is added, only about 40 to 50% of the first chlorination stage filtrate can be recovered to match the stoichiometric equivalent of sodium atoms used in the extraction. Where, however, the available chlorine is provided predominantly by chlorine dioxide, typically above about 70%, the quantities of sodium and chlorine atoms are susbstantially equivalent and hence it is preferred to employ the latter sequence.

Sodium chloride present in the bleach plant effluent also may arise from sodium chloride present in the pulp when it is introduced to the bleach plant. Such sodium chloride may be present where the logs are floated in sea water prior to formation of wood chips therefrom. The use of sea-borne logs also causes there to be present in the black liquor sodium chloride from washing of the pulp in the brown stock washer. In addition, if brackish water is used to provide the bleach plant wash water, sodium chloride again is present to the bleach plant effluent.

Alkali metal salts may be introduced to the pulp mill system, from other sources, such as from the cellulosic fibrous material itself. Further, sodium chloride may be introduced as a contaminant of make up chemicals, provided from a natural source or formed as a product of a chemical process. For example, the make up chemical may be sodium sulphate from a natural source contaminated with sodium chloride or sodium hydroxide formed by electrolysis of sodium chloride solution and contaminated with sodium chloride.

In the present invention, the bleach plant effluent preferably is added to the spent liquor recovery and regeneration operation, and in this way this effluent is retained within the mill. It has been proposed previously in Canadian Pat. No. 832,347 and U.S. Pat. No. 3,698,995 to reduce the environmental problems of bleach plant effluents by utilizing the spent wash waters to wash the pulp in the brown stock washer. The use of the spent wash water in this manner reduces the overall water requirement of the mill. In the present invention, it is preferred to use the bleach plant effluent, consisting of a mixture of spent wash waters, preferably provided by countercurrent washing as described in Canadian Pat. No. 832,347 and U.S. Pat. No. 3,698,995, spent bleaching chemicals and spent caustic extraction liquor to wash the pulp in the brown stock washer. By operating in this manner, the water requirement is reduced and in addition a liquid effluent-free pulp mill is provided.

In a particular manner of carrying out such countercurrent washing in a CEDED sequence in which the pulp is washed after every step, there is a completely countercurrent flow of liquors, namely spent bleaching liquors, spent caustic extraction liquors and wash water, with respect to the flow of pulp through the bleach plant. In such an operation, fresh water or white water is passed into contact with the pulp following the last bleaching stage, the spent wash water from this washing being mixed with spent chlorine dioxide solution from the last bleaching stage. The resulting mixture is split into two streams, the bulk being used to wash the pulp from the last caustic extraction stage, and the remainder being used to mix with spent caustic extraction effluent from the last caustic extraction stage, the mixture being used partially to mix with effluent from the washing step after the intermediate bleaching stage.

The remainder of the mixture is used as wash water to wash the pulp from the intermediate bleaching stage. Spent bleaching chemical from this stage is mixed with the aqueous material resulting from the last mixing, the resulting material, representing the combined effluents from the subsequent steps of the bleach plant, being used partially to wash the pulp from the first caustic extraction stage and partially to wash the pulp from the first bleaching stage. The spent wash water from the washing of the pulp from the first caustic extraction stage is mixed with spent caustic extraction liquor from the first caustic extraction and the mixture is divided into two streams, one of which represents an alkaline effluent and the other is used as wash water for the pulp from the first bleaching stage. The spent wash water from this stage is mixed with spent bleaching chemical from the first bleaching stage to provide an acid liquor, part of which constitutes an acid bleach plant effluent.

Another part of the acid liquor may be used to mix with the pulp received from the brown stock decker to provide the water required to bring the pulp to the consistency necessary in the first bleaching stage. A further part of the acid liquor is used as the aqueous medium for gaseous chlorine used in the first bleaching stage. In this way, a portion of the acid liquor, constituted by the latter two parts may be recycled in the first bleaching step.

The acid spent bleaching chemical liquor is mixed with the alkaline caustic extraction liquor to provide the bleach plant effluent which is used to wash the pulp in the brown stock washer.

The bleach plant effluent may be introduced at other stages of the recovery and regeneration operation, as desired. Further, the bleach plant effluent may be split into two or more streams which are introduced at different locations of the recovery and regeneration operations, for example, to provide the "weak wash" water or to dilute concentrated white liquor.

The quantity of sodium chloride present in the bleach plant effluent varies depending on the bleaching sequence which is employed. In a typical procedure where a mixture of chlorine dioxide and chlorine are utilized in the first stage of a CEDED sequence the quantity of sodium chloride may vary between about 120 and 160 lbs/ton of pulp depending on the proportion of chlorine dioxide used. Typically, when the total available chlorine in the first stage is provided 70% by chlorine dioxide and 30% by chlorine, the quantity is about 120 lbs/ton of pulp.

The introduction of the bleach plant effluent to the pulping liquor recovery and regeneration operations closes the whole system to liquid effluents and hence sodium chloride cannot be purged from the mill by way of discarded bleach plant effluent. The sodium chloride remains unconverted by the black liquor recovery steps and hence would build up in the system upon continued recycle of regenerated white liquor.

In order to prevent such build up and at the same time utilize the concepts of an effluent-free pulp mill, it is essential to remove sodium chloride from the system. Such removal of sodium chloride should be such that the other valuable components utilizable as or convertible into pulping chemicals are not removed from the system along with the sodium chloride and hence the normal chemical balance and economy is retained. In addition, it is preferred to remove a quantity of sodium chloride from the mill equivalent to the amount introduced to and/or produced within the mill, typically about 120 lbs./ton pulp.

The present invention in a preferred aspect therefore is directed to the removal from the mill of sodium chloride introduced thereto with bleach plant effluent. However, in its broadest aspect, the invention is directed to the removal from the mill of sodium chloride present therein from any source, such as one or more of the sources mentioned above.

In Canadian Pat. No. 915,361 and U.S. Pat. No. 3,746,612, it is proposed to remove sodium chloride from pulp mill recovery and regeneration procedures by concentration of white liquor, preferably by evaporation, in order to precipitate and remove sodium chloride from the white liquor. This procedure is satisfactory and may be utilized to remove the desired quantity of sodium chloride from the mill.

The sodium chloride also is present in the green liquor prior to causticization together with sodium sulphide and sodium carbonate. The causticization operation normally carried out on the green liquor therefore is exposed to the sodium chloride-content of the green liquor, which may cause a lowering in the efficiency of the causticization operation and hence an increase in the quantity of uncausticized sodium carbonate present in the white liquor and a decrease in the alkalinity content ($NaOH + Na_2S$) of the white liquor as compared with causticization of green liquor to obtain white liquor in the absence of sodium chloride. In addition, the presence of the sodium chloride in the green liquor may cause corrosion problems in the recausticizer. It, therefore, would be of advantage if sodium chloride could be removed from the system prior to the causticization.

It is not possible, however, to use the process outlined in the above-mentioned Canadian Pat. No. 915,361 and U.S. Pat. No. 3,746,612 to precipitate sodium chloride directly from the green liquor, due to the presence therein of substantial quantities of sodium carbonate which would be precipitated.

SUMMARY OF INVENTION

The present invention makes it possible to recover sodium chloride from the system after formation of the smelt and prior to causticization. The present invention broadly is directed to the removal of sodium chloride from sodium sulphide liquors which usually are substantially sodium hydroxide free.

In the process of the present invention, the components of a sodium sulphide-, sodium carbonate-, sodium sulphate- and sodium chloride-containing smelt are fractionated to provide an aqueous solution of the sodium sulphide and sodium chloride, and a solid mass containing sodium carbonate and sodium sulphate substantially free from the sodium sulphide and the sodium chloride. Thereafter, the aqueous solution of the sodium sulphide and the sodium chloride, is manipulated to deposit sodium chloride therefrom, the precipitated salt being separated from the concentrated solution.

In addition to sodium sulphide, sodium carbonate and sodium chloride, green liquor and the smelt from which it is formed commonly contain dissolved quantities of other salts, typically sodium- and sulphur- compounds, mainly sodium sulphate but also usually including minor quantities of sodium sulphite, sodium thiosulphate and sodium polysulfide, due to the inefficient operation of the furnace and later oxidation of sodium sulphide.

Some of these sodium- and sulphur- compounds usually remain in solution during the processing steps of the present invention, typically sodium thiosulphate and sodium polysulphide. These materials in the white liquor recycled to the digestion stage do not build up since they are subjected to the recovery and regeneration operation when the spent pulping liquor containing these recycled materials is forwarded to such operation.

The present invention is described hereinafter with particular reference to sodium sulphate since this particular sodium- and sulphur- compound is the predominant one of these materials. The present invention applies however with reference to other sodium- and sulphur- compounds and other salts having similar solubility characteristics.

The solid mass containing sodium carbonate and sodium sulphate separated from the smelt in the fractionation step may be dissolved in water and the resulting sulphide-free green liquor is causticized to provide sulphide-free white liquor, which may be mixed with the manipulated sodium sulphide solution, with dilution, if required, to provide a pulping liquor suitable for recycle to the digestion step. Uncausticized quantities of sodium carbonate and the sodium sulphate, i.e. unregenerated pulping chemicals, present in the sulphide-free white liquor, therefore, are returned to the black liquor and hence to the recovery steps.

GENERAL DESCRIPTION OF INVENTION

The manner of achieving the fractionation and manipulation of the sodium sulphide solution to remove sodium chloride are not critical to this invention. Broadly, the invention involves separation of the bulk of the sodium carbonate and sodium sulphate values from the other components of the smelt and utilization of an aqueous sodium sulphide solution having low sodium carbonate and sodium sulphate concentrations as compared to green liquor as the medium from which sodium chloride is separated.

In one embodiment, the solid mass may be dissolved in aqueous material to provide an aqueous solution of the components. In place of the normal quantity of water used to form green liquor and dictated by considerations associated with the recausticizing step, the quantity of water utilized to dissolve the solid mass preferably is that quantity necessary only to dissolve the smelt. Operation in this manner decreases the quantity of water required to form the green liquor and, hence, the overall quantity of water utilized may be decreased as compared with the overall quantity used in a white liquor concentration process as set forth in Canadian Pat. No. 915,361 and U.S. Pat. No. 3,746,612, where conventional quantities of water are utilized in the formation of green liquor. Further, since less water is used, less water is required to be evaporated to recover the same quantity of sodium chloride and hence the capital and operating costs may be decreased.

The aqueous solution resulting from dissolving the smelt in aqueous material is concentrated to deposit a mixture of sodium carbonate and sodium sulphate, the concentration being continued until the solution is substantially saturated with sodium chloride. The deposited mixture is removed and the resulting aqueous solution is manipulated to deposit sodium chloride. This may be achieved by concentrating the aqueous solution further to deposit a mixture of sodium chloride, sodium carbonate and sodium sulphate which is removed from the concentrated aqueous solution, and from which pure sodium chloride is recovered. The concentrations may both be carried out by evaporation, preferably by boiling under a reduced pressure or at superatmospheric pressure, if desired.

In an alternative manipulative procedure for the removal of sodium chloride, following removal of the deposited mixture of sodium carbonate and sodium sulphate, the resulting aqueous solution of sodium sulphide may be cooled to deposit sodium chloride therefrom in substantially pure form, the sodium chloride being removed from the cooled solution. Thereafter, the mother liquor may be concentrated further, if desired, to deposit a mixture of sodium chloride, sodium sulphate and sodium carbonate which is removed from the resulting concentrated sodium sulphide solution, thereby removing additional quantities of sodium chloride from the sodium sulphide solution. The latter concentration step, however, may be omitted, if desired.

An alternative smelt fractionation procedure which may be utilized involves leaching the smelt to remove therefrom substantially all the sodium sulphide and substantially all the sodium chloride values and leave a solid mass consisting substantially of sodium carbonate and sodium sulphate. The resulting aqueous sodium sulphide solution containing the dissolved sodium chloride values of the smelt, usually together with some dissolved sodium carbonate and sodium sulphate, then may be subjected to the above-described manipulative procedures to remove sodium chloride therefrom. The solid mass may be converted to sulphide-free white liquor, as described above.

DESCRIPTION OF PREFERRED EMBODIMENTS

Figure 1:
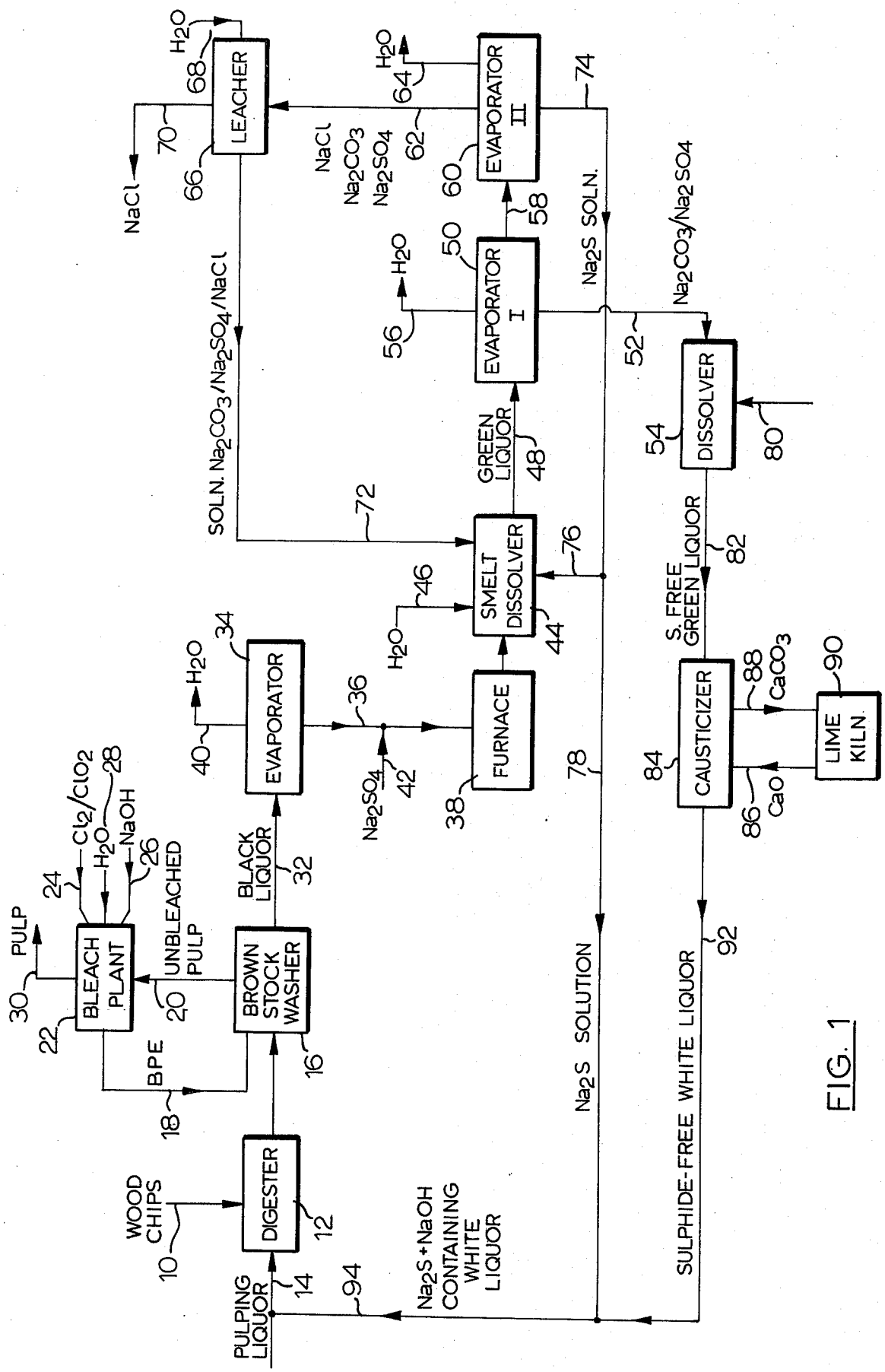
FIG. 1 is a schematic flow sheet of one embodiment of the invention integrated with a pulp mill operation.

Referring first to FIG. 1, wood chips, or other raw cellulosic fibrous material, are fed by line 10 to a digester 12 wherein the wood chips are digested with a pulping liquor fed by line 14 and containing sodium sulphide and sodium hydroxide as the active pulping chemicals, and hence utilizing the Kraft process.

The resulting pulp and black liquor are separated and the pulp is washed in a brown stock washer 16. The pulp is washed, in the embodiment illustrated, with aqueous bleach plant effluent fed by line 18. Alternatively, the pulp may be washed with water or "contaminated condensate", and the bleach plant effluent may be utilized elsewhere in the system, as described in more detail below. In order to avoid the formation of hydrogen sulphide during this washing step when the bleach plant effluent is used, it is preferred to provide the bleach plant effluent at neutral or slightly alkaline pH, typically around pH 9.

The washed and unbleached pulp is fed by line 20 to a bleach plant 22 wherein the pulp is subjected to a series of bleaching and purification processes involving the use of one or more chlorine-containing bleaching agents. Generally, the bleaching and purification processes involve bleaching with chlorine, chlorine dioxide or mixtures thereof fed by line 24 and purification by caustic extraction, using aqueous sodium hydroxide solution fed by line 26, typically in a CEDED sequence as described above. The pulp is washed during the bleach plant operations, typically after each bleaching or caustic extraction operation, by water fed by line 28. The spent wash water from the bleach plant washing operations together with the spent chemicals from the bleaching and caustic extraction steps provide the bleach plant effluent in line 18.

Preferably, the washing operations involve countercurrent flow of pulp and wash water through the bleach plant. Preferably, the quantity of sodium hydroxide used in the caustic extraction of the pulp is slightly in excess of the stoichiometric requirement of one sodium atom for each chlorine atom in the bleaching chemicals, whereby the bleach plant effluent in line 18 has an alkaline pH, as mentioned above. The bleached and purified pulp of required brightness is recovered from the bleach plant 22 by line 30 and is passed to paper making procedures.

If desired, the bleach plant effluent in line 18 may be added directly to the black liquor in line 32, although this procedure is less preferred, since the overall water requirement thereby is increased.

The bleach plant effluent in line 18 contains considerable quantities of sodium chloride which are transferred to the black liquor in line 32. The black liquor is evaporated in an evaporator 34 prior to passage by line 36 to a furnace 38 of any convenient construction. The water recovered from the evaporator 34 by line 40 may be used to provide at least part of the water requirement of the system, for example, as at least part of the water fed to the bleach plant in line 28, after suitable cleaning, if required.

Sodium sulphate, or other source of sodium-and sulphur-values, such as spent acid, is added to the black liquor in the furnace 36, typically by addition by line 42 to the evaporated liquor in line 36. The sodium sulphate, which may be added in solid, slurry or aqueous solution form, is used to make up the sodium and sulphur values lost from the system in the chemical recovery and regeneration processing steps.

The black liquor forms in the furnace 38 a smelt containing sodium sulphide and sodium carbonate, and additionally unreacted components, consisting of sodium chloride and sodium sulphate and other sodium sulphur-oxygen salts.

Thus, there is obtained from the furnacing operation a smelt containing sodium sulphide, sodium carbonate, sodium chloride and sodium sulphate. This smelt is subjected to various operations in accordance with the various embodiments of the invention to remove sodium chloride.

In accordance with the embodiment of FIG. 1, the smelt is dissolved in a smelt dissolver 44 in water fed by line 46. The water preferably is constituted by "weak wash" water from the washing of calcium carbonate mud following causticization. The water passed by line 46 to the smelt dissolver 44 may be partially bleach plant effluent from line 18, especially in the case where fresh water or contaminated condensate is fed to the brown stock washer 16. The bleach plant effluent used in this manner first may be used to wash the calcium carbonate mud and hence provide the weak wash water.

The resulting green liquor in line 48 also contains recycled chemicals as described in more detail below. In addition to sodium sulphide, the green liquor contains dissolved quantities of sodium carbonate, sodium sulphate and sodium chloride from the smelt and/or from the bleach plant effluent when such is used in line 46. The quantity of sodium sulphate and other sodium sulphur-oxygen salts present in the green liquor depends on the efficiency of the furnacing operation and the extent of oxidation of oxidisable sodium-sulphur salts, typically sodium sulphide, after furnacing.

In accordance with this embodiment of the invention, the green liquor is evaporated in a first evaporator-crystallizer 50 to deposit a mixture of sodium carbonate and sodium sulphate. The evaporation, which may be carried out in any convenient manner, typically by boiling, under a reduced pressure or a superatmospheric pressure, if desired, is continued until the substantially saturation point of sodium chloride is reached, i.e. up to the point where further concentration would result in precipitation of sodium chloride. The bulk of the sodium carbonate and sodium sulphate values of the green liquor precipitate in this step, usually as anhydrous sodium carbonate mixed with the double salt, burkeite, $Na_2CO_3 \cdot 2Na_2SO_4$.

While other unregenerated pulping chemicals, which are present in only minor amounts may be precipitated along with the sodium carbonate and sodium sulphate, the procedure is described with particular reference to the latter two chemicals.

In certain instances, the evaporation and precipitation may be carried out to a point where the solution is less than saturated with sodium chloride. Further, co-precipitation of small quantities of sodium chloride in the first stage evaporator-crystallizer 50 may be tolerable.

The first stage evaporator-crystallizer 50 may be of any convenient form, such as, a single evaporation vessel or may consist of a plurality of interlinked evaporation vessels The green liquor evaporation to deposit sodium carbonate and sodium sulphate may be carried out over a wide range of conditions. Typically, the evaporation may be carried out at a temperature of from about 120° to about 260° F or up to about 280° F, with a reduced pressure or a superatmospheric pressure being used, as required, to provide the green liquor at its boiling point at the chosen temperature.

The sodium sulphide concentration of the green liquor also is a factor determining the deposition of the sodium carbonate and sodium sulphate, and usually varies between about 5 and about 30 wt. % $Na_2S$.

The deposited solid mixture of sodium carbonate and sodium sulphate is separated from the mother liquor and passes by line 52 to a dissolver 54. The water evaporated from the green liquor in the evaporator 50 leaves by line 56 and is collected.

The mother liquor, consisting of an aqueous sodium sulphide solution containing sodium sulphide, sodium chloride and residual quantities of the sodium carbonate and sodium sulphate values of the smelt, passes from the first stage evaporator-crystallizer 50 by line 58 to a second stage evaporator-crystallizer 60. While two separate evaporator-crystallizers 50 and 60 are illustrated, this manner of illustration is for convenience in describing this embodiment of the invention. Two separate evaporation operations may be carried out in the same apparatus, with separation of solid precipitate from mother liquor after each step. Alternatively, two or more separate evaporators may be employed, if desired.

The aqueous sodium sulphide solution, saturated with respect to sodium chloride and residual amounts of sodium sulphate and sodium carbonate but not saturated with respect to sodium sulphide, is evaporated in the second stage evaporator-crystallizer 60 to deposit a mixture of sodium chloride, sodium carbonate and sodium sulphate, which is removed by line 62. Water vapour is removed by line 64. The evaporation of the sodium sulphide solution in the second-stage evaporator-crystallizer 60 may be carried out in any convenient manner, typically by boiling, if desired, under a reduced pressure or at superatmospheric pressure.

The second stage evaporation may be carried out over a wide range of temperatures and sodium sulphide concentration conditions. A typical temperature range is from about 120° to about 280° F, with a reduced pressure or a superatmospheric pressure being used, as required, to provide the sodium sulphide solution at its boiling point at the chosen temperature. A typical range of sodium sulphide concentration in the sodium sulphide solution being concentrated is about 20 to about 45 wt. % $Na_2S$.

The water recovered by lines 56 and 64 may be used to provide part of the water requirement of the system. For example, the water recovered by lines 56 and 64 may be used to provide at least part of the water fed to the bleach plant by line 28.

The mixture recovered in line 62 consists predominantly of sodium chloride contaminated with sodium carbonate and sodium sulphate and is treated to recover substantially pure sodium chloride. As illustrated the mixture is passed to a leacher 66 to which water is fed by line 68 to dissolve substantially all the sodium carbonate and sodium sulphate values of the mixture together with some of the sodium chloride, leaving substantially pure sodium chloride, which is recovered by line 70 after washing, if required, to remove entrained liquor. Where such washing occurs, the spent wash water may be used to provide part of the water fed to the leacher by line 68.

The leaching of the recovered mixture may be carried out over a wide range of temperatures, preferably to minimize the chloride concentration in the aqueous phase resulting from the leaching. Usually, temperatures in the range of about 65° to about 110° F are used.

Preferably, the concentration of the aqueous sodium sulphide solution in the second stage evaporator-crystallizer 60 and the leaching operation are carried out in such a manner that the quantity of sodium chloride recovered by line 70 is substantially equal to the quantity of sodium chloride introduced to the system, normally through bleach plant effluent 18 and hence a balanced system may be provided.

Any other convenient manner of separation of substantially pure sodium chloride from the mixture may be used. For example, the precipitate may be subjected to fractionation by physical classification of crystal sizes. Crystals of sodium chloride are large cubic crystals, crystals of sodium carbonate are small and needle-like and crystals of burkeite are small and flat.

The precipitate in line 62 may be slurried with an aqueous solution saturated with sodium chloride, sodium carbonate and sodium sulphate and passed upwardly through a tower, resulting in separation out of the heavier and larger sodium chloride crystals while the sodium carbonate and burkeite crystals continue out of the tower. These latter crystals may be collected in any convenient manner.

The precipitate need not be separated from the concentrated sodium sulphide solution resulting from the second stage evaporator-crystallizer 66 for this physical separation since the sodium sulphide solution may constitute the saturated solution. The sodium carbonate and sodium sulphate remaining with the concentrated sodium sulphide solution after separation of the solid phase may be recycled therewith by line 74 to the digester 12 and hence to the furnace 38. Alternatively, the solid phase may be separated prior to dilution of the concentrated sodium sulphide solution.

Usually, the sodium chloride recovered by this physical separation technique remains contaminated with some sodium carbonate and sodium sulphate. In this case, such a mixture may be subjected to leaching in the same manner as the solid mixture in line 62.

A further physical classification procedure involves passing the slurry of the deposited materials through a sieve plate which allows the sodium carbonate and burkeite to pass through, but not the larger sodium chloride crystals. The sodium chloride crystals then are recovered. Any residual contamination by sodium carbonate and sodium sulphate may be removed by leaching. The slurry, after removal of the sodium chloride, then may be treated to remove the sodium carbonate and burkeite crystals, such as by contact with a fine sieve through which the crystals cannot pass.

Figure 2:
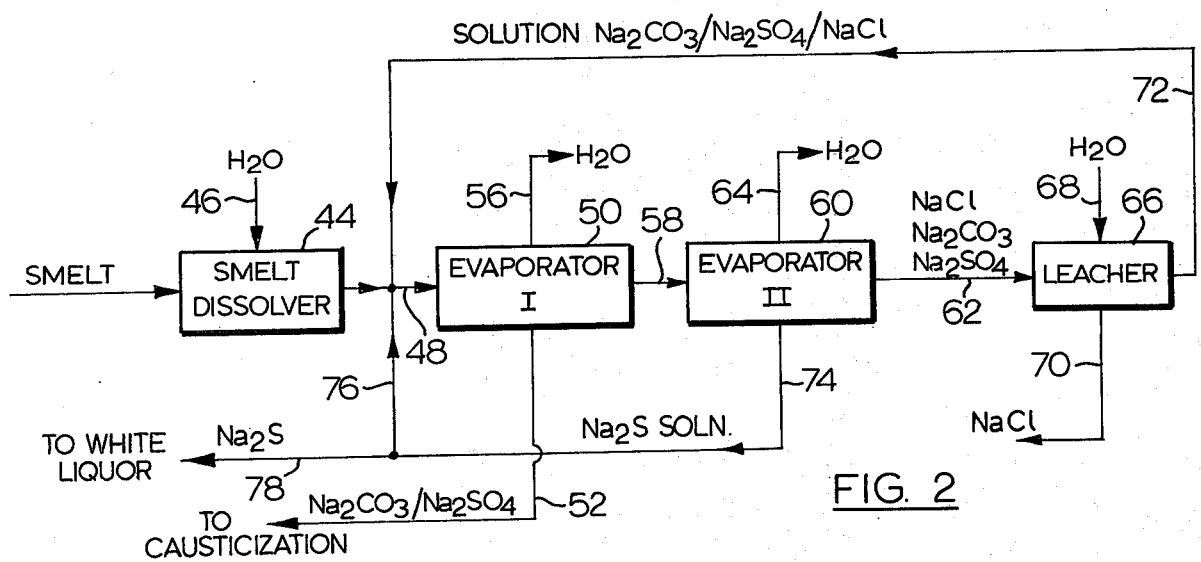
FIG. 2 is a schematic flow sheet of a modified recycle arrangement for the embodiment of FIG. 1.

The aqueous solution of sodium carbonate, sodium sulphate and sodium chloride formed in the leacher 66, or in a leaching operation which is combined with a physical separation as described above, is passed by line 72 to the green liquor in line 48. This is achieved in the embodiment of FIG. 1 by feeding the solution to the smelt dissolver 44 with the water fed by line 46 to dissolve the smelt. As shown in the modification of FIG. 2, the aqueous solution may be added to the green liquor after formation thereof to provide the recycled solution in the green liquor. Alternatively, the aqueous solution in line 72 may be fed to the evaporator 50 to join with the green liquor during the first stage evaporation.

The concentrated sodium sulphide solution formed in the evaporator-crystallizer 60 in line 74 partially is recycled by line 76 to the green liquor in line 48, typically by feeding the same to the smelt dissolver 44 with the water fed by line 46 to dissolve the smelt. Alternatively, as shown in the modification of FIG. 2, the recycled sodium sulphide solution in line 74 may be fed to the first stage evaporator 50 to join with the green liquor evaporated therein.

The recycle of sodium sulphide solution increases the strong alkali content (i.e. $Na_2S$ + NaOH) of the aqueous sodium sulphide solution which is concentrated in the second stage evaporator-crystallizer 60.

The remainder of the concentrated sodium sulphide solution, which has a decreased sodium chloride content and may contain residual amounts of unregenerated pulping chemicals, is contained in line 78.

The mixture of sodium carbonate and sodium sulphate in line 52 fed to the dissolver 54 is dissolved in water fed by line 80 to form sulphide-free green liquor which passes by line 82 to a causticizer 84 wherein substantially all the sodium carbonate values are converted to sodium hydroxide by lime fed to the causticizer 84 through line 86. The calcium carbonate mud precipitated in the causticizer 84 is separated from the resulting sulphide-free white liquor, and is forwarded by line 88 to a lime kiln 90 for formation of further amounts of lime.

The calcium carbonate mud is washed with water or BPE to remove entrained amounts of white liquor prior to passage to the lime kiln 90. The spent wash water from the latter washing is the weak wash used preferably to dissolve the smelt in the smelt dissolver 44 along with the recycled sodium sulphide solution. The use of this dilute sodium hydroxide solution in dissolving the smelt increases further the strong alkali content of the sodium sulphide solution concentrated in the second evaporator-crystallizer 60.

The sulphide-free white liquor, consisting of an aqueous solution of sodium hydroxide containing sodium sulphate and uncausticized sodium carbonate, is passed by line 92 to mix with the sodium sulphide solution in line 78, with suitable dilution with water or BPE, if required, to provide the desired proportion of sodium sulphide to sodium hydroxide to form a white liquor in line 94 containing sodium sulphide and sodium hydroxide, which is recycled to form at least part of the pulping liquor in line 14.

The sulphide-free white liquor in line 92 may be used wholly or in part in other manners. For example, the sulphide-free white liquor in line 92 may be fed to the bleach plant 22 as at least part of the caustic extraction liquor fed by line 26 thereto. Where the bleach plant 22 includes at least one oxygen bleaching step, the sulphide-free white liquor in line 92 may be utilized to provide the sodium hydroxide for the oxygen bleaching step.

The sulphide-free white liquor in line 92 also may be used to increase the strong alkali content of the sodium sulphide solution in line 58. This may be achieved by feeding the sulphide-free white liquor to the smelt dissolver 44, to the green liquor 48 or to the first stage evaporator 50. This recycle may be made generally only to the extent that the remaining amount of sulphide-free white liquor joining with the concentrated sodium sulphide solution in line 78 contains an amount of sodium sulphate equivalent to that contained in the smelt from the furnace 38 in order to avoid the build up of sodium sulphate in the system.

The water required for dilution of the sodium sulphide solution in line 78 or the white liquor in line 94 may be provided at least in part by water recovered in lines 40, 56 and 64, or by BPE.

The presence of residual quantities of sodium chloride and unregenerated pulping chemicals in the recycled white liquor in line 94 usually is not disadvantageous since the sodium sulphate and other sodium- and sulphur- compound values are used in the furnace 38 and the sodium carbonate values are cycled in the system to the causticizer 84. Any sodium chloride values in the white liquor in line 94 cycle through the system and while it is a dead load, under steady state conditions the quantity remains substantially constant since the quantity removed in the evaporator-crystallizer 60 is approximately equal to the amount of sodium chloride introduced to the system. Therefore, while the white liquor in line 94 contains a dead load of non-active chemicals, this dead load, under steady state conditions, is substantially constant and hence does not impair the operation to any significant degree.

Figure 3:
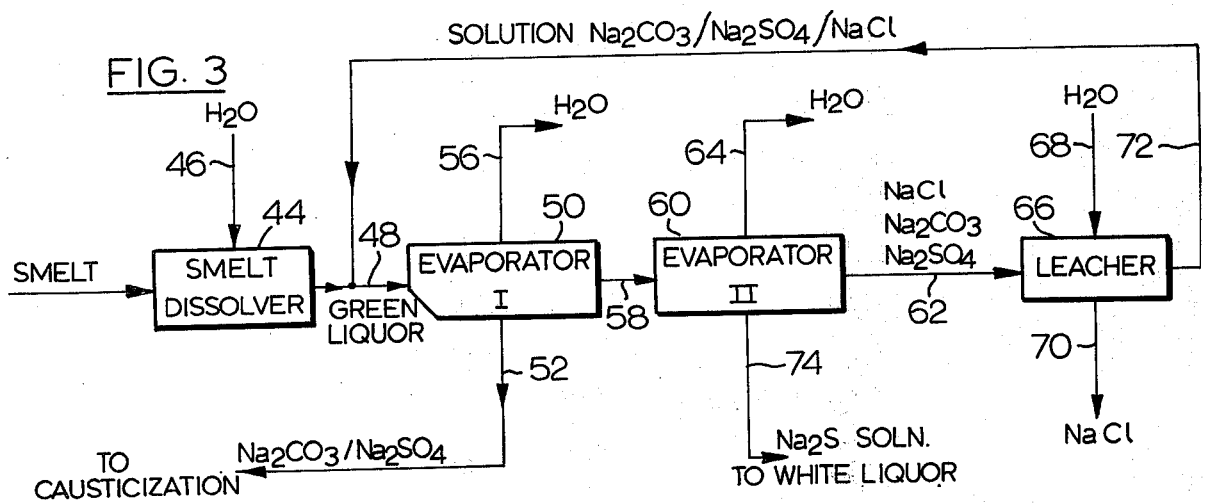
FIG. 3 is a schematic flow sheet of a further modification of the embodiment of FIG. 1.

In the modification of FIG. 3, the recycle of sodium sulphide solution by line 76 is omitted. This procedure increases the quantity of sodium chloride borne by the sodium sulphide solution, as compared with the recycle procedure of FIGS. 1 and 2, and may be adopted where the desired quantity of sodium chloride is removable from the sodium sulphide solution in the second evaporator 60 under the conditions prevailing therein.

The pure sodium chloride which is recovered by line 70 may be put to a variety of uses. Typically, the sodium chloride is utilized to regenerate bleach plant chemicals. For example, the sodium chloride may be used to generate sodium hydroxide and chlorine by electrolysis of an aqueous solution thereof, the sodium hydroxide being used in the bleach plant in line 26 and the chlorine being used in line 24. Alternatively, the sodium chloride may be used to generate chlorine dioxide and chlorine by reaction with sodium chlorate and sulphuric acid, the chlorine dioxide and chlorine being fed to the bleach plant by line 24. Further, the sodium chloride may be electrolyzed as an aqueous solution to sodium chlorate for use in a chlorine dioxide producing reaction involving reduction of the sodium chlorate in an acid medium.

Figure 4:
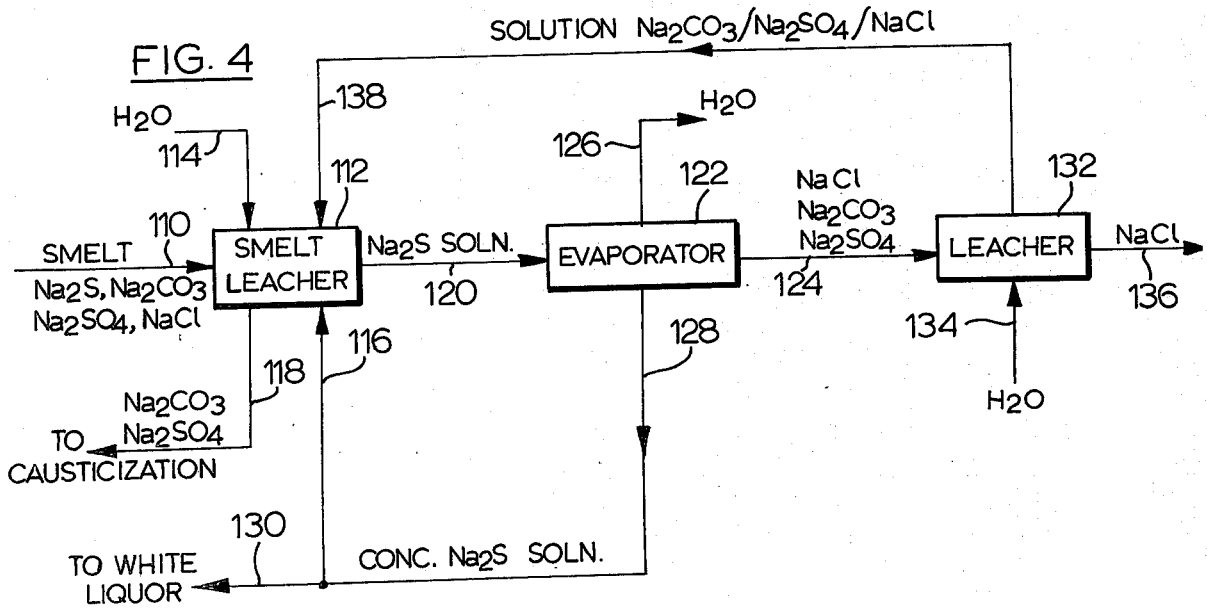
FIG. 4 is a schematic flow sheet of a second embodiment of the invention.

Turning now to consideration of FIG. 4, there is illustrated a further embodiment of the invention in which an alternative manner of fractionating the smelt is used. In this Figure and the remainder of the drawings, only the manipulative procedures involved in treating the smelt to remove sodium chloride and a solid mixture of sodium carbonate and sodium sulphate, and to form an aqueous sodium sulphide solution having a decreased sodium chloride content are illustrated. It will be understood that these procedures may be integrated with a pulp mill system in analagous manner to that illustrated in FIG. 1 for the manipulative procedures described therein.

Referring to FIG. 4, a sodium sulphide-, sodium carbonate-, sodium sulphate-, and sodium chloride-containing smelt obtained from a furnace, as described above with reference to FIG. 1, is fed by line 110 to a smelt leacher 112. In the smelt leacher 112, the smelt is contacted by water fed through line 114 which may be weak wash for the reasons described above with reference to FIG. 1. A recycled concentrated sodium sulphide solution in line 116 also is used in the smelt leaching.

The leaching operation dissolves the sodium sulphide- and sodium chloride- values from the smelt together with some of the sodium carbonate- and sodium sulphate- values, leaving a solid mass consisting essentially of a mixture of sodium carbonate and sodium sulphate which is removed from the leacher by line 118. The mixture in line 118 passes to causticization as described above in connection with FIG. 1.

The smelt leaching may be carried out over the same temperature range as used in the first stage evaporation as carried out in the embodiment of FIGS. 1 to 3, typically from about 120° to about 260° F.

The aqueous sodium sulphide solution passes from the smelt leacher 112 by line 120 to an evaporator-crystallizer 122 of any convenient construction. In the evaporator-crystallizer 122 the aqueous sodium sulphide solution is concentrated to deposit a mixture of sodium chloride, sodium carbonate and sodium sulphate which is removed by line 124. The concentration of the sodium sulphide solution usually is carried out by boiling, under a reduced pressure or a superatmospheric pressure, if desired.

The conditions for carrying out the evaporation of the sodium sulphide solution may be those used in the embodiment of FIGS. 1 to 3 in the second stage evaporator 60.

The water evaporated from the aqueous sodium sulphide solution is removed by line 126 and, after condensation, may be used to provide part of the water required of the system. The resulting concentrated sodium sulphide solution having a decreased sodium chloride content, and being substantially free from sodium carbonate and sodium sulphate, is removed from the evaporator-crystallizer 122 by line 128, part being recycled in line 116 and part passing by line 130 to form white liquor for recycle to the digester, as described above with reference to FIG. 1.

The mixture of sodium chloride, sodium carbonate and sodium sulphate separated from the concentrated sodium sulphide solution consists predominantly of sodium chloride and is passed to a leacher 132, or is subjected to any other convenient separation procedure, wherein the mixture is contacted with water fed by line 134, which dissolves substantially all the sodium carbonate and sodium sulphate values from the mixture together with some of the sodium chloride, leaving a solid mass of substantially pure sodium chloride which is recovered by line 136.

The temperature of the water fed by line 134 to the leacher 132 may be within the range discussed above for the leaching carried out in the embodiment of FIGS. 1 to 3.

The solution of sodium carbonate, sodium sulphate and sodium chloride resulting from the leacher 132 is passed by line 138 to the smelt leacher 112 as part of the aqueous material contacting the smelt.

The quantity of sodium chloride recovered by line 136 preferably is substantially the same as the quantity introduced to the black liquor recovery system.

The embodiment of the invention described above with reference to FIG. 4 has an advantage over that of FIGS. 1 to 3, in that one evaporation only is required in the case of the embodiment of FIG. 4 as compared to the two concentration procedures of FIGS. 1 to 3, thereby decreasing the quantity of water which requires evaporating, thereby decreasing the capital and operating costs of the process, as compared with that illustrated in FIGS. 1 to 3.

Figure 5:
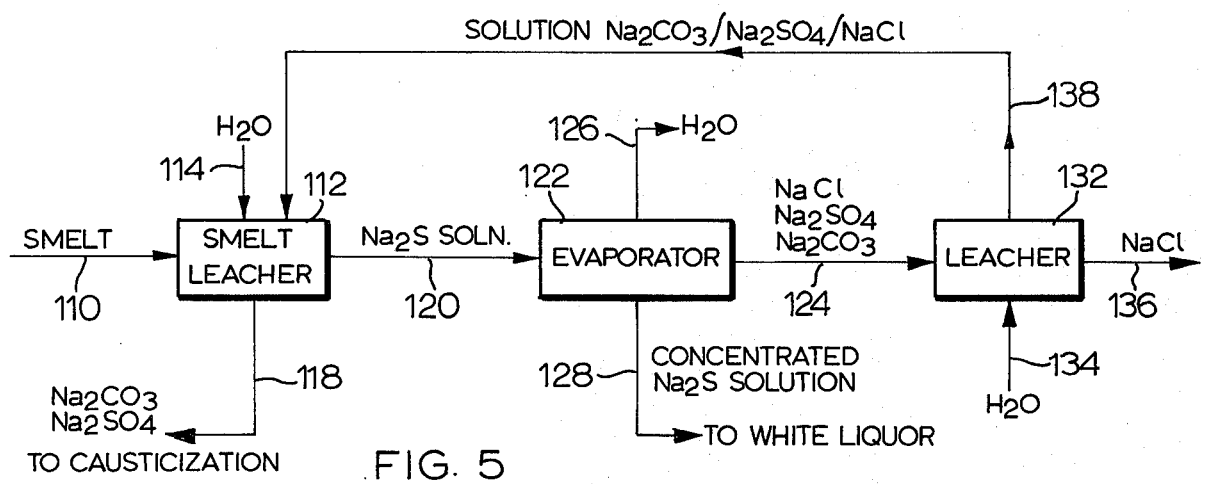
FIG. 5 is a schematic flow sheet of a modification of the embodiment of FIG. 4.

In the modification of the procedure of FIG. 4 shown in FIG. 5, the recycle of sodium sulphide solution by line 116 is omitted. This procedure may be adopted where the desired quantity of sodium chloride is removable from the sodium sulphide solution in the evaporator 122.

The sodium chloride which is recovered by line 136 may be used in any desired manner as described above in connection with the embodiment of FIGS. 1 and 2.

Figure 6:
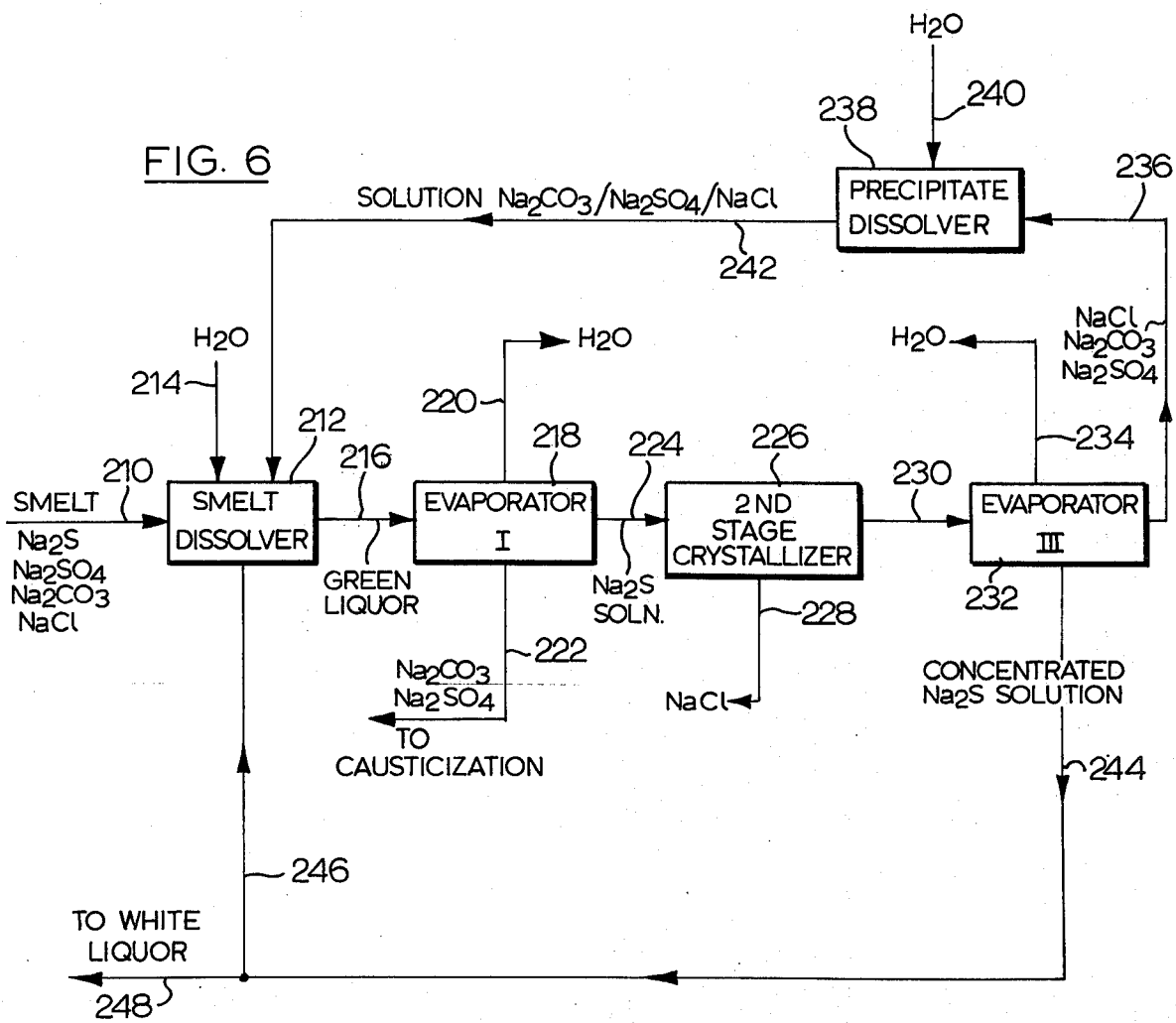
FIG. 6 is a schematic flow sheet of a third embodiment of the invention.

Considering now FIG. 6, which illustrates an alternative manipulative procedure to that illustrated in FIGS. 1 to 3 for the recovery of sodium chloride.

A sodium sulphide-, sodium carbonate-, sodium sulphate- and sodium chloride- containing smelt obtained from a furnace, as described above with reference to FIG. 1, is fed by line 210 to a smelt dissolver 212. The smelt is dissolved in water fed by line 214. The resulting green liquor in line 216 also contains recycled chemicals as described in more detail below. In addition to sodium sulphide, the green liquor contains dissolved quantities of sodium carbonate, sodium sulphate and sodium chloride from the smelt.

In accordance with this embodiment, the green liquor in line 216 first is evaporated in a first stage evaporator 218 to precipitate sodium sulphate and sodium carbonate until the white liquor is substantially saturated with sodium chloride; i.e. up to the point where further concentration would result in the precipitation of sodium chloride.

The first stage evaporation may be carried out on the green liquor under the temperature and sodium sulphide concentration conditions discussed above in connection with the green liquor concentration step of the embodiment of FIGS. 1 to 3.

The water resulting from the evaporation may be recovered in line 220 and utilized to provide part of the overall water requirement of the system.

The concentration of the green liquor in the first stage evaporator 218 deposits the bulk of the sodium sulphate and sodium carbonate from the green liquor. The salts precipitated from the green liquor in the first stage evaporator 218, i.e. unregenerated pulping chemicals, are removed by line 222 and are forwarded to causticization, as described above with reference to FIG. 1.

The sodium sulphide solution resulting from the first stage evaporator 218 is passed by line 224 to a second stage crystallizer 226, wherein the sodium sulphide solution is cooled, with evaporation, if desired, to precipitate substantially pure sodium chloride therefrom. It is possible to precipitate substantially pure sodium chloride by cooling since under the prevailing conditions the solubility of sodium chloride decreases with decreasing temperature whereas for sodium carbonate and burkeite, the solubility changes only slightly with decreasing temperature relative to the change in solubility of sodium chloride. The sodium chloride precipitated in the second stage crystallizer 226 is removed therefrom by line 228, and is washed to remove entrained liquor.

The temperature to which the sodium sulphide solution is cooled to deposit sodium chloride depends to a certain degree on the temperature of operations of the green liquor evaporation, although generally final temperatures in the range of about 80° to about 150° are used, the spread between the initial and final temperatures preferably being as wide as feasible.

The sodium sulphide concentration of the cooled sodium sulphide solution may vary widely, typically in the range of about 5 to about 28 wt.% $Na_2S$. It is preferred to utilize concentrations in the upper portion of this range to minimize the quantity of sodium chloride required to be recycled.

The sodium chloride recovered in line 228, in the form of solid product may be put to a variety of uses, as discussed in more detail above.

The sodium sulphide solution from the second stage crystallizer 226 having a reduced sodium chloride content is passed by line 230 to a third stage evaporator 232. While two separate evaporators 218 and 232 and an intermediate crystallizer 226 are illustrated, this manner of illustration is for convenience in describing this embodiment of the invention. Two separate evaporation operations and the intermediate crystallization may be carried out in the same apparatus with separation of solid precipitate from mother liquor after each step. Separate vessels may be employed, if desired.

In the third stage evaporator 232, the sodium sulphide solution fed by line 230 is evaporated to precipitate therefrom further quantities of sodium chloride and unregenerated pulping chemicals. The concentration of the sodium sulphide solution in the third stage evaporator 232 may be carried out to precipitate part or substantially all of the precipitatable non-pulping components of the partially concentrated sodium sulphide solution.

The evaporation of the sodium sulphide solution in the third stage evaporator 232 preferably is carried out by boiling, as described above. The water resulting from the evaporation is recovered by line 234 and may be utilized to provide part of the water requirement of the system.

The concentration of the sodium sulphide solution in the evaporator 232 may be carried out under the conditions discussed above in connection with the second stage evaporation in the embodiment of FIGS. 1 to 3.

The solid precipitate from the third stage evaporator 232 is removed therefrom by line 236 and is passed to a precipitate dissolver 238. The solid precipitate consists mainly of sodium chloride contaminated with quantities of sodium carbonate and sodium sulphate.

Water is fed to the precipitate dissolver 238 by line 240 to dissolve the sodium chloride, sodium carbonate and sodium sulphate.

The aqueous solution resulting from the precipitate dissolver 238 in line 242 may be recycled to the green liquor in line 216. The aqueous solution in line 242 may be recycled to the smelt dissolver 212 to combine with the water fed by line 214 to form the green liquor. Alternatively, the aqueous solution in line 242 may be added to a solution of the smelt in water leaving the smelt dissolver 212. In either case, the aqueous solution in line 242 is present in the green liquor fed to the evaporator 218.

In order to maintain a balanced operation in a continuously operating system, it is preferred to remove from the system by line 228, substantially the same amount of sodium chloride as is introduced to the system.

The concentrated sodium sulphide solution formed in the second evaporator-crystallizer 232 in line 244 partially is recycled by line 246 to the green liquor in line 216, typically by feeding the same to the smelt dissolver 212 with the water fed by line 214. The remainder of the concentrated sodium sulphide solution, which has a reduced sodium chloride content, is forwarded by line 248 to form white liquor as described above with reference to the concentrated sodium sulphide solution in line 78.

Figure 7:
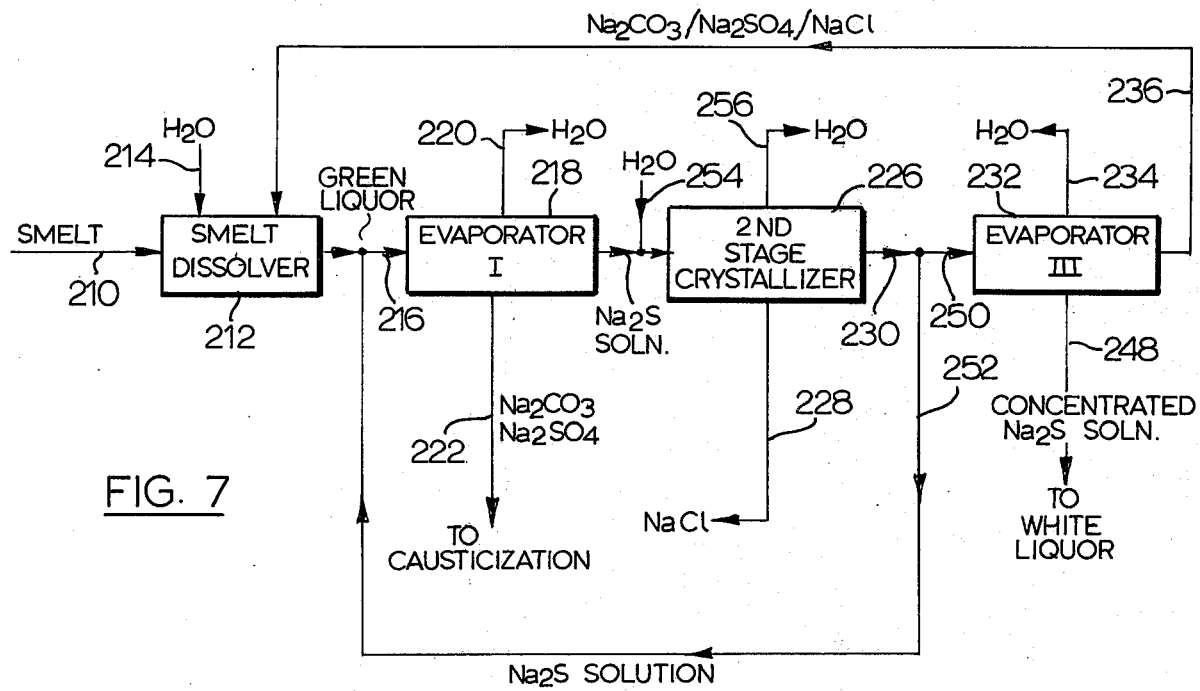
FIG. 7 is a schematic flow sheet of a modification of the embodiment of FIG. 6.

The flow sheet of FIG. 7 shows a modification of the procedure of the embodiment of FIG. 6. Thus, in the modification of FIG. 7, the cooled sodium sulphide solution resulting from the second stage crystallizer 226 is split into two streams, one of the streams passing by line 250 to the evaporator 232 and the other stream passing by line 252 to the green liquor in line 216. This modification is preferred in instances where there is a considerable recycle of sodium sulphide within the system. In the modification of FIG. 7 the recycled sodium sulphide solution is not subjected to the evaporation in evaporator 232, thereby decreasing the evaporative load of the evaporator 232.

The recycled sodium sulphide solution is recycled directly to the green liquor in the modification of FIG. 7 rather than to the smelt dissolver as illustrated in FIG. 6. Additionally, the solid mixture of sodium carbonate, sodium sulphate and sodium chloride removed from the sodium sulphide solution in the evaporator 232 is recycled directly to the smelt dissolver 212 by line 236 in the modification of FIG. 7, to be dissolved by the water fed by line 214. This modification avoids the provision of a separate dissolving step for this precipitate, as ilustrated in FIG. 6.

A further modification of the embodiment of FIG. 6, shown in FIG. 7 consists of a water feed line 254 to allow dilution of the sodium sulphide solution in line 224 to modify the concentrations of the components to ranges which ensure precipitation of pure sodium chloride on cooling in the crystallizer 226.

Further, provision is made in line 256 for the removal of water vapor flashed from the sodium sulphide solution during the cooling. Usually, the quantity of water flashed during the cooling, when such evaporation is carried out, is fed back to the system, such as in line 254, so that, in effect there is no net flashing of water from the sodium sulphide solution during the cooling step to precipitate pure sodium chloride.

Figure 8:
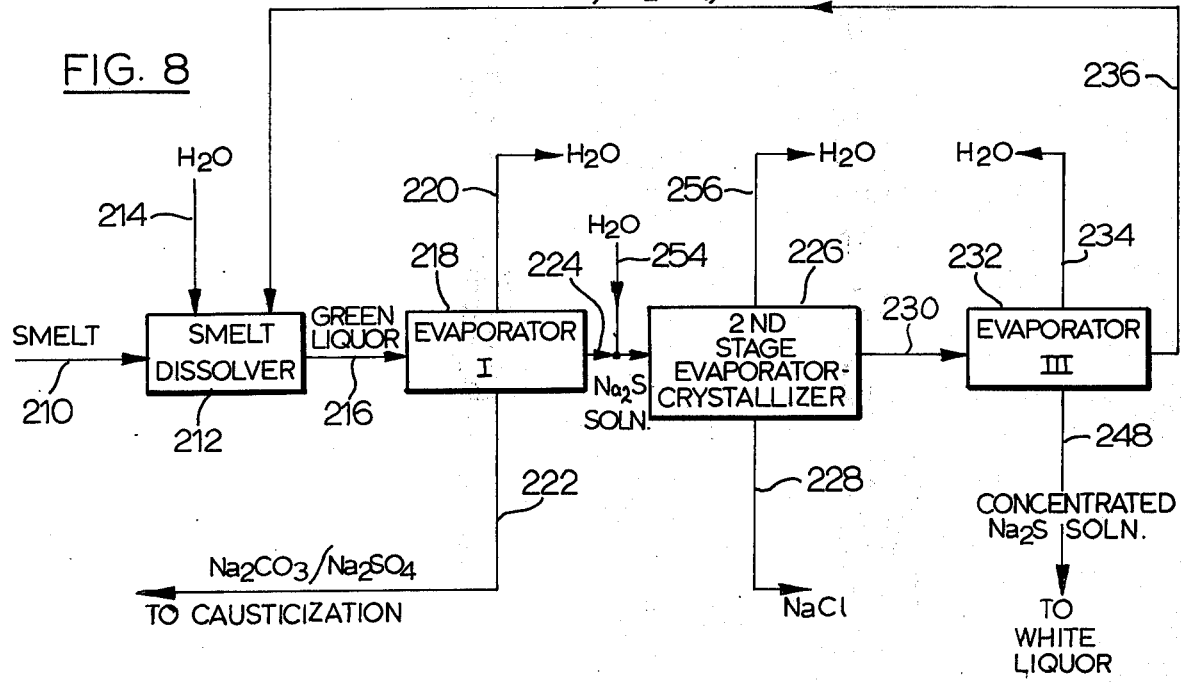
FIG. 8 is a schematic flow sheet of a further modification of the embodiment of FIG. 6.

The modification of FIG. 8 incorporates the recycle of a solid mixture of sodium carbonate, sodium sulphate and sodium chloride by line 236 to the smelt dissolver 212, the provision of a water feed line 254 and the provision for the removal by line 256 of water vapor flashed from the sodium sulphide solution during the cooling in the crystallizer 226, as described above in connection with FIG. 7.

Recycle of sodium sulphide solution is completely omitted, however, in the modification of FIG. 8. This procedure may be adopted where the alkalinity of the sodium sulphide solution in line 224 is sufficient to enable the desired quantity of sodium chloride to be removed by line 228 on cooling.

Figure 9:
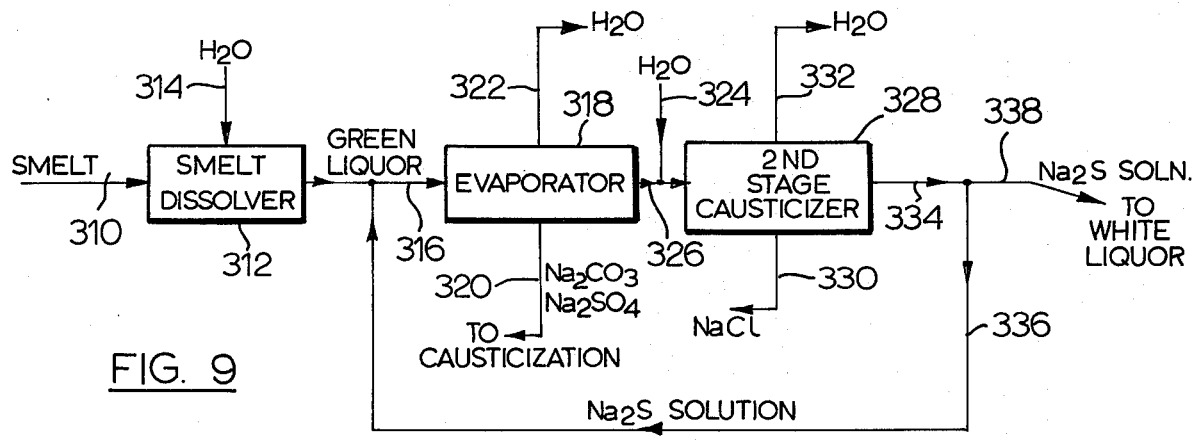
FIG. 9 is a schematic flow sheet of an additional modification of the embodiment of FIG. 6.

Turning now to the embodiment of FIG. 9, a sodium sulphide-, sodium carbonate-, sodium chloride-and sodium sulphate-containing smelt is fed by line 310 to a smelt dissolver 312 wherein the smelt is dissolved in water, usually weak wash, fed by line 314. The resulting green liquor in line 316 and containing recycled sodium sulphide solution is passed to an evaporator 318 wherein the green liquor is evaporated, typically by boiling, to deposit a mixture of sodium carbonate and sodium sulphate which is removed from the evaporator 318 by line 320 for passage to causticization as described in more detail above in connection with the embodiment of FIG. 1.

The evaporation of the green liquor in the evaporator 318 is continued up to the approximate point of saturation of the resulting sodium sulphide solution by sodium chloride, the evaporated water being removed by line 322.

The concentration of the green liquor in the evaporator 318 may be carried under the conditions discussed above in connection with the green liquor evaporation in the evaporator 50 in the embodiment of FIGS. 1 to 3.

The hot sodium sulphide solution is passed, after dilution, if desired, by water fed by line 324, to a crystallizer 328 wherein the sodium sulphide solution is cooled to cause precipitation of substantially pure sodium chloride, which is removed from the second stage crystallizer 328 by line 330. Preferably the quantity of sodium chloride removed is substantially the same as that present in the smelt in line 310 excluding any sodium chloride values cycling as a dead load.

The cooling of the hot sodium sulphide solution to precipitate pure sodium chloride may be carried out in the manner described for the cooling step in the second stage crystallizer 226 in the embodiment of FIGS. 6 to 8.

The sodium chloride removed by line 330 may be put to a variety of uses, as discussed in more detail above in connection with FIG. 1.

The cooling in the crystallizer 328 may be carried out by flash cooling, if desired, the water vapor being removed by line 332. The water removed in line 332 is returned to the system, typically by line 324, so that there is no net flashing of water in the crystallizer 328.

The sodium sulphide solution having a decreased sodium chloride content is removed from the crystallizer 328 by line 334, part being recycled by line 336 to the green liquor in line 316 and part being forwarded by line 338 to form the white liquor recycled to the digester.

The embodiment of FIG. 9, therefore, shows a manipulative procedure wherein the evaporation carried out on the sodium sulphide solution after removal of sodium chloride in the embodiment of FIG. 6 and the modification thereof of FIG. 7 is omitted. The procedure of this embodiment may be used where the residual sodium chloride in the sodium sulphide solution in line 334 is tolerable in the remainder of the system and hence additional, quantities thereof need not be removed in an additional evaporation step and retained in a closed loop in the smelt manipulation procedure.

Figure 10:
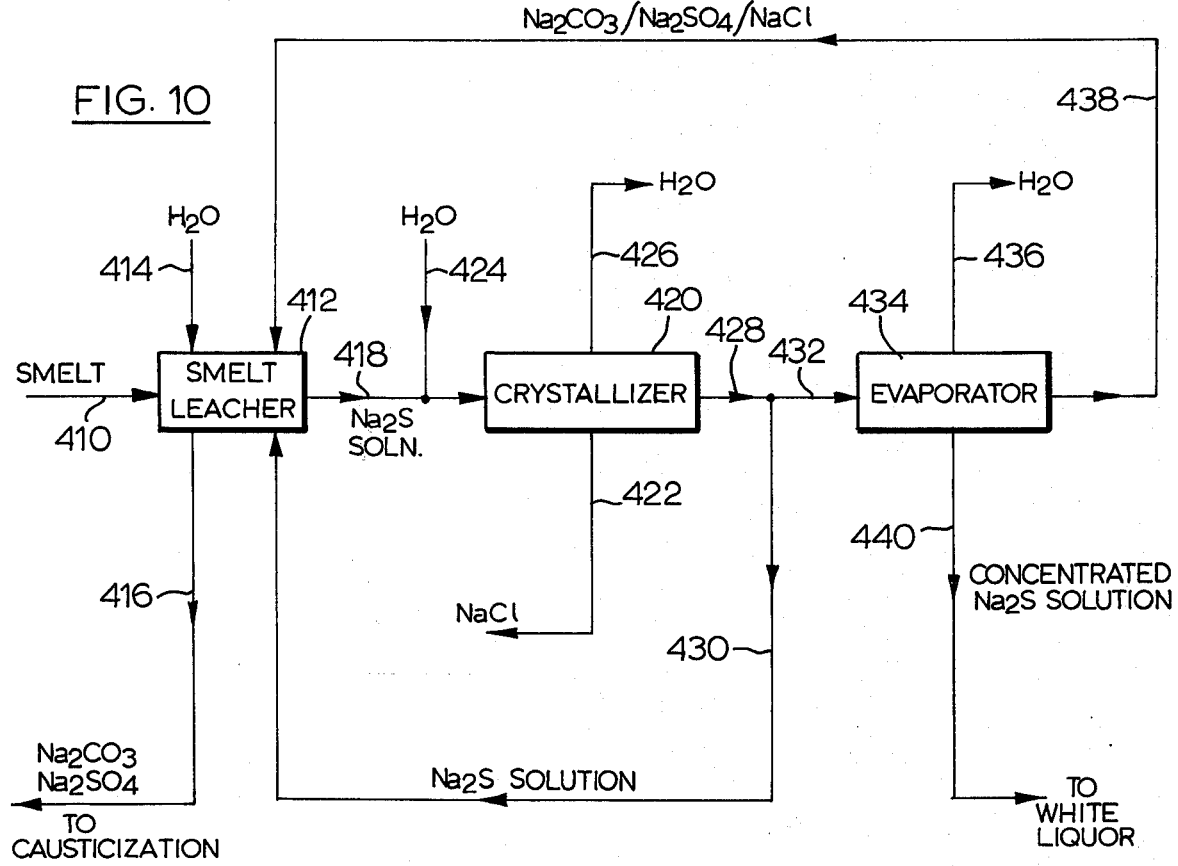
FIG. 10 is a schematic flow sheet of a fourth embodiment of the invention.

A further embodiment of the invention is illustrated in FIG. 10 and represents a combination of the fractionation procedure of FIG. 4 and the sodium chloride separation of FIG. 7. Thus, a sodium sulphide-, sodium carbonate-, sodium chloride-and sodium sulphate-containing smelt is fed by line 410 to a smelt leacher 412 wherein the smelt along with recycled solids is contacted with water fed by line 414 to dissolve out the sodium sulphide and sodium chloride values along with part of the sodium carbonate and sodium sulphate values.

The smelt leaching step may be carried out under the conditions described above in connection with the smelt leaching carried out in the embodiment of FIGS. 4 and 5.

The remaining solids consisting essentially of sodium carbonate and sodium sulphate substantially free from sodium sulphide and sodium chloride are removed from the smelt leacher 412 by line 416 and passed to causticization, as described above in connection with FIG. 1.

The hot sulphide solution resulting from the leaching step is passed by line 418 to a crystallizer 420 wherein the sodium sulphide solution is cooled to deposit substantially pure sodium chloride from the sodium sulphide solution, the pure sodium chloride being removed by line 422.

The cooling of the hot sodium sulphide solution to precipitate pure sodium chloride may be carried out in the manner described for the cooling step in the second stage crystallizer 226 in the embodiment of FIGS. 6 to 8.

Dilution of the sodium sulphide solution in line 418 may be carried out by feed of water by line 424 to provide solubility conditions suitable for the deposition of pure sodium chloride on cooling.

Evaporation of water may be carried out during the cooling step, the water being removed by line 426. The water removed by line 426 may be returned such as by line 424 so that there is no net evaporation of water during the cooling.

The cooled sodium sulphide solution removed from the crystallizer 420 by line 428 partially is recycled by line 430 to the smelt leacher 412. The remainder of the sodium sulphide solution is passed by line 432 to an evaporator 434 wherein the sodium sulphide solution is evaporated by boiling to deposit sodium chloride, sodium carbonate and sodium sulphate from the solution, the evaporated water being removed by line 436.

The concentration of the cooled sodium sulphide solution in the evaporator 434 may be carried out under the conditions described above in connection with the evaporator 232 in the embodiment of FIGS. 6 to 8.

The deposited solids are removed from the evaporator 434 by line 438 and recycled to the smelt leacher 412 to be contacted therein by the water fed by line 414.

The concentrated sodium sulphide solution resulting from the concentration in the evaporator 434 is forwarded by line 440 to form white liquor for recycle to the digester, as described above in connection with the embodiment of FIG. 1.

Figure 11:
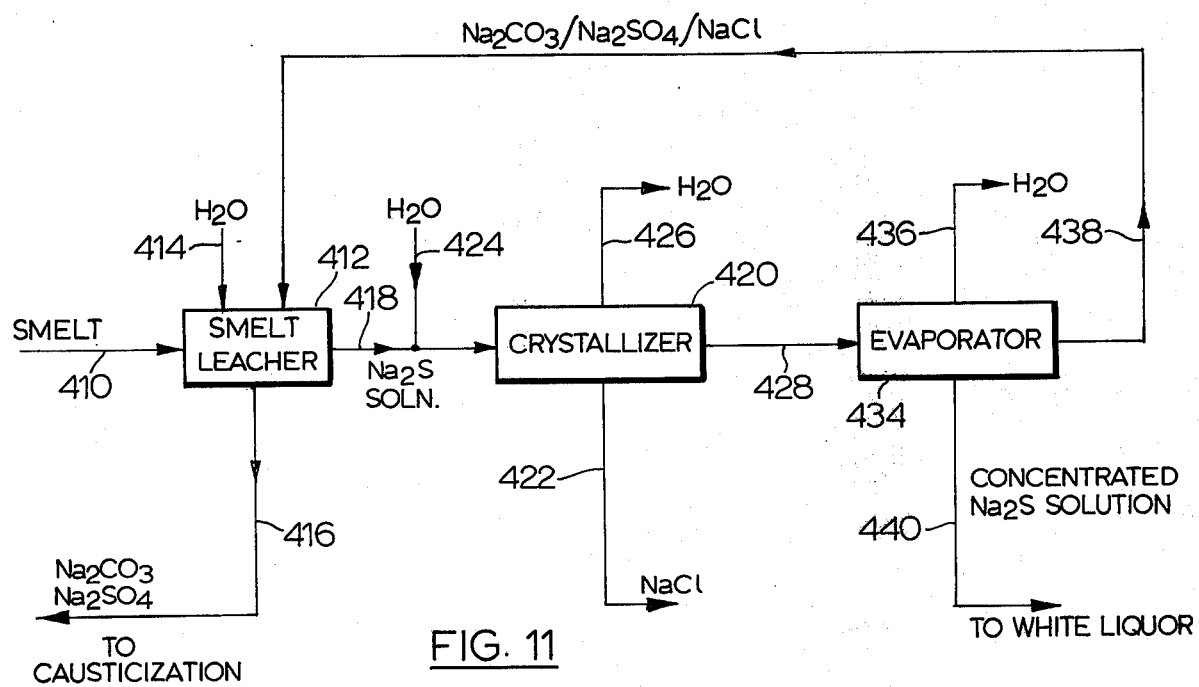
FIG. 11 is a schematic flow sheet of a modification of the embodiment of FIG. 10.
Figure 12:
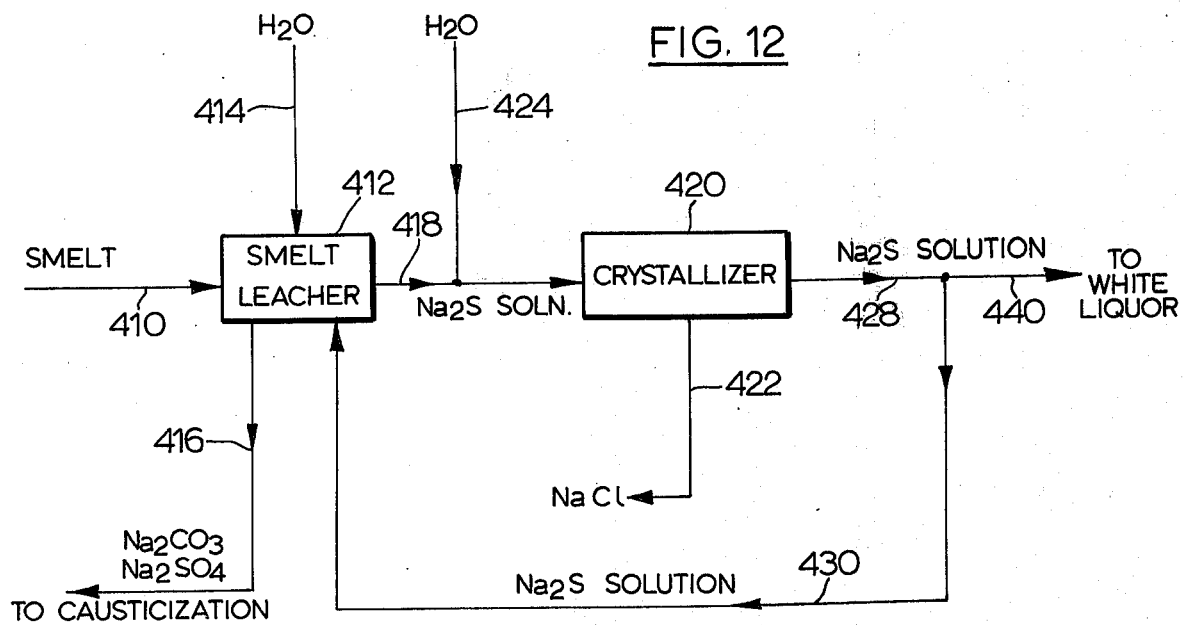
FIG. 12 is a schematic flow sheet of a further modification of the embodiment of FIG. 10.

FIGS. 11 and 12 illustrate modifications of the procedure of FIG. 10. Thus, in the modification of FIG. 11, recycle of sodium sulphide solution by line 430 is omitted. This may be carried out in instances where the conditions of the cooled sodium sulphide solution in line 418 allow the removal of the required amount of pure sodium chloride. In the modifications of FIG. 12, recycle of sodium sulphide solution by line 430 occurs, but the concentration in evaporator 434 is omitted. This procedure may be used where the residual quantity of sodium chloride in the sodium sulphide solution in line 440 is tolerable.

EXAMPLES

The invention is illustrated further by the following Examples.

Example I

A study of the relative solubilities of the components of the system $Na_2S-NaCl-Na_2CO_3-Na_2SO_4-H_2O$ at various temperatures and sulphide ion concentrations was undertaken. Small quantities of sodium hydroxide were present in the liquors. The following Table gives the results of the study.

Table

| Temperature °F | $Na_2S$ | NaOH | NaCl | $Na_2CO_3$ | $Na_2SO_4$ |
|---|---|---|---|---|---|
| | | | wt.% | | |
| 120 | 21.4 | 0.4 | 5.96 | 1.65 | 0.31 |
| 120 | 24.8 | 0.3 | 4.38 | 1.07 | 0.20 |
| 131 | 21.8 | 0.1 | 6.44 | 1.51 | 0.19 |
| 212 | 20.2 | 0.7 | 8.15 | 2.04 | 0.24 |
| 212 | 22.4 | 0.21 | 7.43 | 1.63 | 0.17 |
| 212 | 35.4 | 0.7 | 2.27 | 0.41 | 0.11 |
| 235 | 22.7 | 0.3 | 7.51 | 2.08 | 0.22 |
| 243.5 | 26.7 | 0.7 | 5.73 | 1.09 | 0.23 |
| 266.5 | 36.3 | 1.6 | 2.92 | 0.88 | 0.16 |

EXAMPLE II

Based on the solubility data of Example I and the known solubility data for the system $NaCl-Na_2CO_3-Na_2SO_4-H_2O$ a mass balance was calculated for an approximately 500 ton per day pulp mill utilizing the smelt manipulation procedure of FIGS. 1 and 2.

24,908 lbs/hr of smelt containing 4010 lbs of sodium sulphide, 3412 lbs of sodium chloride, 16,863 lbs of sodium carbonate and 623 lbs of sodium sulphate is contacted with 96,765 lbs/hr of water (line 46) and 11,993 lbs/hr of a recycle stream (line 72) containing 1931 lbs of sodium chloride, 1329 lbs of sodium carbonate, 106 lbs of sodium sulphate and 8627 lbs of water to form 133,666 lbs/hr of green liquor (line 48) containing 4010 lbs sodium sulphide, 5343 lbs of sodium chloride, 18,192 lbs of sodium carbonate, 729 lbs of sodium sulphate and 105,392 lbs of water. 44,187 lbs/hr of a recycle solution (line 76) containing 16,039 lbs of sodium sulphide, 1290 lbs of sodium chloride, 407 lbs of sodium carbonate, 70 lbs of sodium sulphate and 26,381 lbs of water is added to the green liquor.

The resulting solution is boiled at 235°F (evaporator 50) to evaporate 72,161 lbs/hr of water and to deposit 17,367 lbs/hr of a solid mixture containing 16,762 lbs of sodium carbonate and 605 lbs of sodium sulphate, the solid mixture being removed (line 52).

The resulting 88,325 lbs/hr of sodium sulphide solution containing 20,049 lbs of sodium sulphide (representing a concentration of 22.7%), 6633 lbs of sodium chloride, 1837 lbs of sodium carbonate, 194 lbs of sodium sulphate and 59,612 lbs of water is boiled (evaporator 60) at 266.5° F to evaporate 26,636 lbs/hr of water and to deposit 6456 lbs/hr of a solid mixture of 5021 lbs of sodium chloride, 1329 lbs of sodium carbonate and 106 lbs of sodium sulphate, the solid mixture being removed (line 62).

The 55,233 lbs/hr of concentrated sodium sulphide solution containing 20,049 lbs of sodium sulphide (36.3%), 1612 lbs of sodium chloride, 508 lbs of sodium carbonate, 88 lbs of sodium sulphate and 32,976 lbs of water is removed (line 74) and split into the 44,187 lbs/hr recycle stream mixed with the green liquor (line 76) and 11,046 lbs/hr of solution containing 4010 lbs of sodium sulphide, 322 lbs of sodium chloride, 101 lbs of sodium carbonate, 18 lbs of sodium sulphate and 6595 lbs of water for forwarding to form white liquor (line 78).

The solids formed in the second evaporation are leached at 95°F with 8627 lbs/hr of water (in leacher 66) to form 11,993 lbs/hr of the recycle aqueous solution (line 72) and leave 3090 lbs/hr of pure sodium chloride.

EXAMPLE III

A mass balance was calculated for an approximately 500 ton/day pulp mill utilizing the manipulative procedure of FIG. 3, where sodium sulphide recycle is omitted.

24,908 lbs/hr of a smelt containing 16,863 lbs of sodium carbonate, 4010 lbs of sodium sulphide, 3412 lbs of sodium chloride and 623 lbs of sodium sulphate is dissolved in 124,540 lbs of water and the resulting green liquor is mixed with 10,780 lbs/hr of recycle leach liquor containing 1401 lbs of sodium carbonate, 1724 lbs of sodium chloride, 133 lbs of sodium sulphate and 7522 lbs of water. The aqueous solution is boiled (evaporator 50) to evaporate 103,504 lbs/hr of water and to deposit sodium carbonate monohydrate and sodium sulphate, 20,267 lbs/hr of solid being removed (line 52) and containing 16,806 lbs of sodium carbonate, 607 lbs of sodium sulphate and 2854 lbs of water.

The resulting 36,454 lbs/hr of sodium sulphide solution containing 1458 lbs of sodium carbonate, 4010 lbs of sodium sulphide (11%), 5136 lbs of sodium chloride, 146 lbs of sodium sulphate and 25,704 lbs of water is boiled (in evaporator 60) at 212°F to evaporate 18,591 lbs/hr of water resulting in the deposition of 6406 lbs/hr of solid, leaving a 11,457 lbs/hr of sodium sulphide solution for forwarding to white liquor (line 74) and containing 57 lbs of sodium carbonate, 4010 lbs of sodium sulphide (35%), 264 lbs of sodium chloride, 13 lbs of sodium sulphate and 7113 lbs of water.

The deposited solids consisting of 1401 lbs of sodium carbonate, 4872 lbs of sodium chloride and 133 lbs of sodium sulphate is leached at 40° C (leacher 66) with 7522 lbs/hr of water to form the 10,780 lbs/hr of recycle liquor (line 72) and leach 3148 lbs/hr of pure sodium chloride.

Example IV

A mass balance was calculated for a 500 ton/day pulp mill utilizing the procedure of FIG. 4 and based on the solubility data of Example I and the known solubility data for the system $Na_2CO_3$—$Na_2SO_4$—$NaCl$—$H_2O$.

24,908 lbs/hr of a smelt containing 4010 lbs of sodium sulphide, 3412 lbs of sodium chloride, 16,863 lbs of sodium carbonate and 623 lbs of sodium sulphate is leached (in leacher 112) at 235° F with 24,604 lbs/hr of water, the resulting solution being mixed with 11,993 lbs/hr of recycle solution (line 138) containing 1931 lbs of sodium chloride, 1329 lbs of sodium carbonate, 106 lbs of sodium sulphate and 8627 lbs of water and 44,187 lbs/hr of recycle sodium sulphide solution (line 116) containing 16,039 lbs of sodium sulphide, 1290 lbs of sodium chloride, 407 lbs of sodium carbonate, 70 lbs of sodium sulphate and 26,381 lbs of water to form 88,325 lbs/hr of sulphide solution (in line 120) containing 20,049 lbs of sodium sulphide, 6633 lbs of sodium chloride, 1837 lbs of sodium carbonate, 194 lbs of sodium sulphate and 59,612 lbs of water. The green liquor is boiled at 266.5° F (in evaporator 122) to evaporate 26,636 lbs/hr of water and deposit 6456 lbs/hr of solids containing 5021 lbs of sodium chloride, 1329 lbs of sodium carbonate and 106 lbs of sodium sulphate, the solids being removed (by line 124).

The resulting 55,233 lbs/hr of concentrated sodium sulphide solution containing 20,049 lbs of sodium sulphide, 1612 lbs of sodium chloride, 508 lbs of sodium carbonate, 88 lbs of sodium sulphate and 32,976 lbs of water is split into the 44,187 lbs/hr recycle stream (in line 166) and an 11,046 lbs/hr stream for passage to white liquor (in line 130) and containing 4010 lbs of sodium sulphide, 322 lbs of sodium chloride, 101 lbs of sodium carbonate, 18 lbs of sodium sulphate and 6595 lbs of water.

The solids removed in the sodium sulphide solution concentration are leached (in leacher 132) 8627 lbs/hr of water at 95° F to form the 11,993 lbs/hr recycle stream (in line 138) and to leave 3090 lbs/hr of pure sodium chloride.

Example V

For the manipulative procedure of FIG. 5, a mass balance was calculated for a mill producing about 500 tons/day of pulp.

24,908 lbs/hr of a smelt containing 16,863 lbs of sodium carbonate, 4010 lbs of sodium sulphide, 3412 lbs of sodium chloride and 623 lbs of sodium sulphate is mixed with 10,780 lbs/hr of recycled solution (line 138) containing 1401 lbs of sodium carbonate, 1724 lbs of sodium chloride, 133 lbs of sodium sulphate and 7522 of water before leaching with 21,036 lbs/hr of water at 100° C resulting in the formation of 36,454 lbs/hr of an aqueous sodium sulphide solution (in line 120) containing 1458 lbs of sodium carbonate, 4010 lbs of sodium sulphide, 5136 lbs of sodium chloride, 146 lbs of sodium sulphate and 25,704 lbs of water, leaving 20,267 lbs of solid for recausticization (line 118) and containing 16,806 lbs of sodium carbonate, 607 lbs of sodium sulphate and 2854 lbs of water of crystallization.

The sodium sulphide solution is boiled (in evaporator 122) to evaporate 18,591 lbs/hr of water and to deposit 6406 lbs/hr of solid. The resulting 11,457 lbs/hr of concentrated sodium sulphide solution containing 57 lbs of sodium carbonate, 4010 lbs of sodium sulphide, 264 lbs of sodium chloride, 13 lbs of sodium sulphate and 7113 lbs of water is passed to white liquor (line 128)

The solids deposited in the concentration of the sodium sulphide solution are leached (in leacher 132) at 40° C with 7522 lbs/hr of water, resulting in the 10,780 lbs/hr of recycle aqueous solution (in line 138) and 3148 lbs/hr of pure sodium chloride.

Example VI

Based on the solubility data set forth in Example I, a mass balance was calculated for a pulp mill producing approximately 500 tons/day of pulp and utilizing the smelt manipulation procedure of FIG. 7.

24,908 lbs/hr of smelt containing 4010 lbs of sodium sulphide, 3412 lbs of sodium chloride, 16,863 lbs of sodium carbonate and 623 lbs of sodium sulphate is mixed with 995 lbs/hr of recycled solids (line 236) containing 794 lbs of sodium chloride, 189 lbs of sodium carbonate and 12 lbs of sodium sulphate and the mixture is dissolved in 107,763 lbs/hr of water resulting in 133,666 lbs/hr of green liquor containing 4010 lbs of sodium sulphide, 4206 lbs of sodium chloride, 17,052 lbs of sodium carbonate, 635 lbs of sodium sulphate and 107,763 lbs/hr of water.

The green liquor is mixed with 256,903 lbs/hr of recycled sodium sulphide solution (line 252) containing 54,978 lbs of sodium sulphide, 15,360 lbs of sodium chloride, 4002 lbs of sodium carbonate, 417 lbs of sodium sulphate and 182,146 lbs of water and the mixture is boiled at 212° F (in evaporator 218) to evaporate 109,863 lbs/hr of water and to deposit 17,367 lbs/hr of solids. The solids consisting of 16,762 lbs of sodium carbonate and 605 lbs of sodium sulphate, are removed from the resulting sodium sulphide solution (by line 222) for causticization.

To the resulting 263,339 lbs/hr of sodium sulphide solution (in line 224) containing 58,988 lbs of sodium sulphate (22.4%), 19,566 lbs of sodium chloride, 4292 lbs of sodium carbonate, 447 lbs of sodium sulphate and 180,046 lbs of water are added 15,395 lbs/hr of water (by line 254). The solution is cooled (in crystallizer 226) to 120° F to cause crystallization of 3090 lbs/hr of pure sodium chloride (removed by line 228) and resulting in 275,644 lbs/hr of sodium sulphide solution containing 58,988 lbs of sodium sulphide, 16,476 lbs of sodium chloride, 4292 lbs of sodium carbonate, 447 lbs of sodium sulphate and 195,441 lbs of water.

The latter sodium sulphide solution is divided into the recycle 256,903 lbs/hr of sodium sulphide solution (in line 246) and a 18,741 lbs/hr stream of sodium sulphide solution (in line 250) containing 4010 lbs of sodium sulphate, 1116 lbs of sodium chloride, 290 lbs of sodium carbonate, 30 lbs of sodium sulphate and 13,295 lbs of water. This solution is boiled (in evaporator 232) at 266.5° F to evaporate 6700 lbs/hr of water and to deposit the recycled solid mixture (in line 236) and result in 11,046 lbs/hr of a concentrated sodium sulphide solution for passage to white liquor (by line 248) and containing 4010 lbs of sodium sulphide (36%), 322 lbs of sodium chloride, 101 lbs of sodium carbonate, 18 lbs of sodium sulphate and 6595 lbs of water.

Example VII

A mass balance was calculated for the manipulative procedure of FIG. 8, where sulphide solution recycle is absent, for a 500 ton/day pulp mill.

In 124,540 lbs/hr of water are dissolved 24,908 lbs/hr of a smelt containing 16,863 lbs of sodium carbonate, 4010 lbs of sodium sulphide, 3412 lbs of sodium chloride and 623 lbs of sodium sulphate. 8478 lbs/hr of recycle solids (in line 236) containing 2830 lbs of sodium carbonate, 5410 lbs of sodium chloride and 238 lbs of sodium sulphate were also dissolved in the water.

The green liquor is boiled (in evaporator 218) to evaporate 84,189 lbs/hr of water and to deposit 20,260 lbs/hr of solids containing 16,806 lbs of sodium carbonate, 610 lbs of sodium sulphate and 2854 lbs of water of crystallization, which is removed from the 53,467 lbs/hr of sodium sulphide solution (by line 222) for passage to causticization.

The sodium sulphide solution, containing 2887 lbs of sodium carbonate, 4010 lbs of sodium sulphide, 8822 lbs of sodium chloride, 251 lbs of sodium sulphate and 37,497 lbs of water, then is cooled (in crystallizer 226) to 50° C while evaporating 6696 lbs/hr of water from the solution, resulting in crystallization of 3148 lbs/hr of pure sodium chloride (removed by line 228). The resulting 43,223 lbs/hr of sodium sulphide solution containing 2887 lbs of sodium carbonate, 4010 lbs of sodium sulphide (9.1%), 5674 lbs of sodium chloride, 251 lbs of sodium sulphate and 30,801 lbs of water is boiled (in evaporator 232) to evaporate 23,688 lbs/hr of water and to deposit 8478 lbs/hr of solids. The solids are removed for recycle by line 236.

The 11,457 lbs/hr of concentrated sodium sulphide solution, containing 57 lbs of sodium carbonate, 4010 lbs of sodium sulphide, 264 lbs of sodium chloride, 13 lbs of sodium sulphate and 7113 lbs of water, is forwarded to white liquor formation (by line 248).

Example VIII

For the manipulative procedure of FIG. 9, a mass balance was calculated on the basis of a 500 ton/day pulp mill.

In 124,540 lbs/hr of water are dissolved 24,908 lbs/hr of smelt containing 16,863 lbs of sodium carbonate, 4010 lbs of sodium sulphide, 4205 lbs of sodium chloride and 623 lbs of sodium sulphate. A 163,362 lbs/hr recycle sodium sulphide solution (in line 336) containing 2627 lbs of sodium carbonate, 35,938 lbs of sodium sulphide, 9473 lbs of sodium chloride, 394 lbs of sodium sulphate and 114,930 lbs of water, is added to the solution. The green liquor is boiled (in evaporator 318) to evaporate 111,727 lbs/hr of water and deposit 17,150 lbs/hr of solids, which are removed (by line 320) for causticization, and containing 16,571 lbs of sodium carbonate and 579 lbs of sodium sulphate 184,726 lbs/hr of concentrated sodium sulphide solution, containing 2919 lbs of sodium carbonate, 39,948 lbs of sodium sulphide, 13,678 lbs of sodium chloride, 438 lbs of sodium sulphate and 127,743 lbs of water, are cooled to 50° C (in crystallizer 328) to deposit 3148 lbs/hr of pure sodium chloride (removed by line 330).

The cooled sodium sulphide solution (in line 334) is divided into the 163,362 lbs/hr recycle stream (in line 336) and a 17,216 lbs/hr sodium sulphide stream for passage to while liquor formation (in line 338) and containing 292 lbs of sodium carbonate, 4010 lbs of sodium sulphide, 1057 lbs of sodium chloride, 44 lbs of sodium sulphate and 12,813 lbs of water.

SUMMARY

By the process of the present invention, therefore, it is possible to recover sodium chloride from a sodium chloride-containing smelt by manipulation of a sodium sulphide solution containing dissolved sodium chloride.

Modifications are possible within the scope of the invention.

What I claim is:

1. A pulp mill process including the steps of digesting cellulosic fibrous material with a pulping liquor containing sodium hydroxide and sodium sulphide as the active pulping chemicals to form a pulp and spent pulping liquor, subjecting said pulp to a series of bleaching and purification steps using at least one chlorine-containing bleaching chemical in at least one of the said bleaching steps and aqueous sodium hydroxide-containing solutions in said purification steps, discharging a sodium chloride-containing aqueous effluent from said series of bleaching and purification steps into said spent pulping liquor, converting said spent pulping liquor containing said discharged effluent into a mass containing sodium sulphide, sodium chloride, sodium carbonate and sodium sulphate, fractionating said mass to obtain (a) an aqueous solution of said sodium sulphide, said sodium chloride, sodium carbonate and sodium sulphate and (b) a solid mixture of sodium carbonate in a substantially anhydrous form and sodium sulphate substantially free from sodium sulphide and sodium chloride and containing a substantial proportion of the sodium carbonate content of said mass, manipulating said aqueous solution immediately following said fractionation step to remove sodium chloride in solid form from said aqueous solution and to provide an aqueous sodium sulphide solution having a decreased dissolved sodium chloride concentration, forming an aqueous solution of said solid mixture and causticizing the sodium carbonate values thereof to form a sulphide-free white liquor, mixing at least part of said sulphide-free white liquor with at least part of the said latter aqueous sodium sulphide solution, and utilizing the resulting white liquor as at least part of said pulping liquor.

2. The process of claim 1, including recycling part of said sulphide-free white liquor to said aqueous sodium sulphide solution from which said sodium chloride is recovered.

3. The method of claim 1 including washing said pulp after formation thereof and before passage to said series of bleaching and purification steps and utilizing said sodium chloride containing aqueous effluent in said washing.

4. The method of claim 1 wherein said series of bleaching and purification steps involves a first stage bleaching with chlorine, chlorine dioxide or a mixture thereof, a first stage caustic extraction using sodium hydroxide solution, a second stage bleaching with chlorine dioxide, a second stage caustic extraction with sodium hydroxide solution and a third stage bleaching with chlorine dioxide, the quantity of sodium hydroxide used being equivalent to the quantity of chlorine material used in said bleaching steps, the spent bleaching and caustic extraction being mixed to provide a sodium chloride containing aqueous effluent of substantially neutral pH.

5. The process of claim 4 including separating said pulp and spent pulping liquor while washing said pulp after formation thereof and before passage to said series of bleaching and purification operations, washing said pulp after each said bleaching and caustic extraction, the wash water utilized in said latter washing passing countercurrently to the pulp through said series of bleaching and purification steps, mixing the spent wash water from the latter washing with the spent bleaching and caustic extraction chemicals to provide the sodium chloride-containing aqueous effluent and utilizing said latter effluent in said washing of said pulp prior to passage to said series of bleaching and purification steps, whereby said latter effluent is introduced into said spent pulping liquor.

6. A pulp mill process including the steps of digesting cellulosic fibrous material with a pulping liquor containing sodium hydroxide and sodium sulphide as the active pulping chemicals to form a pulp and spent pulping liquor, converting said spent pulping liquor into a mass containing sodium sulphide, sodium chloride, sodium carbonate and sodium sulphate, fractionating said mass to obtain (a) an aqueous solution of said sodium sulphide, said sodium chloride, sodium carbonate and sodium sulphate and (b) a solid mixture of sodium carbonate in a substantially anhydrous form and sodium sulphate substantially free from sodium sulphide and sodium chloride and containing a substantial proportion of the sodium carbonate content of said mass, manipulating said aqueous solution immediately following said fractionation step to remove sodium chloride in solid form therefrom and to provide an aqueous sodium sulphide solution having a decreased dissolved sodium chloride concentration, forming an aqueous solution of said solid mixture and causticizing the sodium carbonate values thereof to form a sulphide-free white liquor, mixing at least part of said sulphide-free white liquor with at least part of the said latter aqueous sodium sulphide solution, and utilizing the resulting white liquor as at least part of said pulping liquor.

7. The method of claim 6, wherein said sodium chloride is removed from said aqueous sodium sulphide solution by boiling said latter aqueous solution to deposit sodium chloride, sodium carbonate and sodium sulphate therefrom, removing the deposited sodium chloride, sodium carbonate and sodium sulphate from the resulting concentrated sodium sulphide solution and recovering substantially pure sodium chloride from said deposited sodium chloride, sodium carbonate and sodium sulphate.

8. The method of claim 7 wherein said sodium chloride, sodium carbonate and sodium sulphate are deposited from said latter aqueous solution as a mixture, and said substantially pure sodium chloride is recovered by leaching said latter mixture after separation from the concentrated sodium sulphide solution to provide an aqueous solution of sodium carbonate, sodium sulphate and sodium chloride and a solid mass of substantially pure sodium chloride.

9. The method of claim 7 wherein said boiling of said aqueous sodium sulphide solution is carried out at a temperature of from about 120° to about 280°F.

10. The method of claim 9 wherein said concentrated sodium sulphide solution has a sodium sulphide concentration of about 20 to about 45%.

11. The method of claim 8 wherein said leaching is carried out at a temperature of about 65° to about 110°F.

12. The method of claim 6, wherein said sodium chloride is removed from said aqueous sodium sulphide solution by boiling said aqueous sodium sulphide solution to deposit sodium chloride, sodium carbonate and sodium sulphate therefrom, subjecting the resulting slurry to physical classification of crystal sizes to separate from the concentrated aqueous sodium sulphide solution a solid mass containing substantially all said deposited sodium chloride and part of said deposited sodium carbonate and sodium sulphate.

13. The method of claim 12, wherein said separated solid mass containing sodium chloride, sodium sulphate and sodium carbonate is treated to recover substantially pure sodium chloride therefrom.

14. The method of claim 12, wherein said fractionation is achieved by dissolving said mass in an aqueous medium to provide an aqueous solution of the components of said mass, boiling said aqueous solution to deposit therefrom said mixture of sodium carbonate and sodium sulphate, and removing said deposited mixture from the resulting aqueous sodium sulphide solution.

15. The method of claim 12, wherein said fractionation is achieved by leaching said mass with an aqueous medium to provide said aqueous solution containing said sodium sulphide, said sodium chloride, sodium sulphate and sodium carbonate and leave a solid mixture of sodium carbonate and sodium sulphate substantially free from sodium sulphide and sodium chloride.

16. The method of claim 6 wherein said mass is fractionated to provide said solid mixture of sodium carbonate and sodium sulphate substantially free from sodium sulphide and sodium chloride and a hot aqueous solution containing said sodium sulphide, said sodium chloride, sodium carbonate and sodium sulphate and saturated with respect to sodium chloride, and said sodium chloride is removed from said aqueous sodium sulphide solution by cooling said hot aqueous solution to deposit substantially pure sodium chloride therefrom and removing said deposited sodium chloride from the mother liquor.

17. The method of claim 16 including diluting said hot aqueous solution prior to said cooling.

18. The method of claim 16 including evaporating water from said hot aqueous solution during said cooling step.

19. The method of claim 17 including evaporating water from said hot aqueous solution during said cooling in a quantity substantially the same as that diluting said hot aqueous solution.

20. The method of claim 18 wherein said hot aqueous solution is cooled to a temperature in the range of about 80° to 150°F.

21. The method of claim 20 wherein said hot aqueous solution has sodium sulphide concentration in the range of about 5 to about 28%.

22. The method of claim 16, including boiling said mother liquor to deposit a mixture of sodium chloride, sodium sulphate and sodium carbonate and removing the latter mixture from the resulting concentrated sodium sulphide solution.

23. The method of claim 22 wherein said boiling is carried out at a temperature of from about 120° to about 280°F.

24. The method of claim 16 wherein said fractionation is achieved by dissolving said mass in an aqueous medium to provide an aqueous solution of the components of said mass, boiling said aqueous solution to deposit therefrom said mixture of sodium carbonate and sodium sulphate, and removing said deposited mixture from the resulting hot aqueous sodium sulphide solution, and including boiling said mother liquor to deposit a mixture of sodium chloride, sodium sulphate and sodium carbonate, removing the latter mixture from the resulting concentrated sodium sulphide solution, and recycling the removed mixture to said mass.

25. The method of claim 16 wherein said fractionation is achieved by leaching said mass with an aqueous medium to provide said hot aqueous sodium sulphide solution containing said sodium sulphide, said sodium chloride, sodium sulphate and sodium carbonate and leave a solid mixture of sodium carbonate and sodium sulphate substantially free from sodium sulphide and sodium chloride, and including boiling said mother liquor to deposit a mixture of sodium chloride, sodium sulphate and sodium carbonate, removing the latter mixture from the resulting concentrated sodium sulphide solution and recycling the removed mixture to said mass.

26. A pulp mill process including the steps of: digesting cellulosic fibrous material with a pulping liquor containing sodium hydroxide and sodium sulphide as the active pulping chemicals to form a pulp and spent pulping liquor, converting said spent pulping liquor into a mass containing sodium sulphide, sodium chloride, sodium carbonate and sodium sulphate, dissolving said mass in an aqueous medium to provide an aqueous solution of at least part of the components of said mass, boiling said aqueous solution to deposit therefrom a mixture of sodium carbonate in a substanially anhydrous form and sodium sulphate until said aqueous solution is substantially saturated with respect to sodium chloride thereby avoiding the deposition of all but minor quantities of sodium chloride, removing said deposited mixture from the resulting concentrated aqueous sodium sulphide solution, boiling said concentrated aqueous sodium sulphide solution to deposit sodium chloride, sodium carbonate and sodium sulphate therefrom, removing the deposited sodium chloride, sodium carbonate and sodium sulphate from the resulting further concentrated aqueous sodium sulphide solution, recovering substantially pure sodium chloride from said deposited sodium chloride, sodium carbonate and sodium sulphate, forming an aqueous solution of said deposited and removed mixture of sodium carbonate and sodium sulphate and causticizing the sodium carbonate values thereof to form a sulphide-free white liquor, mixing at least part of said sulphide-free white liquor with at least part of the latter aqueous sodium sulphide solution, and utilizing the resulting white liquor as at least part of said pulping liquor.

27. The method of claim 26 wherein said boiling of the aqueous solution of said components of said mass is carried out at a temperature of from about 120° to about 280°F.

28. The method of claim 27 wherein said aqueous solution of at least part of the components of said mass has a sodium sulphide concentration of about 5 to about 30%.

29. The method of claim 26 wherein part of said further concentrated sodium sulphide solution is recycled to said aqueous solution of said components of said mass.

30. The method of claim 26 wherein said sodium chloride, sodium carbonate and sodium sulphate are deposited from said sodium sulphide solution as a mixture and said substantially pure sodium chloride is recovered by leaching said latter mixture after separation from the further concentrated sodium sulphide solution to provide an aqueous solution of sodium carbonate, sodium sulphate and sodium chloride and a solid mass of substantially pure sodium chloride, and including recycliing said aqueous solution of sodium carbonate, sodium sulphate and sodium chloride to said aqueous solution of the components of said mass.

31. The process of claim 26 including the further steps of subjecting said pulp to a series of bleaching and purification steps using at least one chlorine-containing bleaching chemical in at least one of said bleaching steps and aqueous sodium hydroxide solutions in said purification steps and discharging a sodium chloride-containing aqueous effluent from said series of bleaching and purification steps into said spent pulping liquor to provide at least part of said sodium chloride in said mass.

32. A pulp mill process including the steps of: digesting cellulosic fibrous material with a pulping liquor containing sodium hydroxide and sodium sulphide as the active pulping chemicals to form a pulp and spent pulping liquor, converting said spent pulping liquor into a mass containing sodium sulphide, sodium chloride, sodium carbonate and sodium sulphate, leaching said mass with an aqueous medium to provide an aqueous sodium sulphide solution containing said sodium sulphide, said sodium chloride, sodium sulphate and sodium carbonate and substantially saturated with respect to sodium chloride and leave a solid mixture of sodium carbonate in a substanially anhydrous form and sodium sulphate substantially free from sodium sulphide and sodium chloride, boiling said aqueous sodium sulphide solution to deposit sodium chloride, sodium carbonate and sodium sulphate therefrom, removing the deposited sodium chloride, sodium carbonate and sodium sulphate from the resulting concentrated aqueous sodium sulphide solution, recovering substantially pure sodium chloride from said deposited sodium chloride, sodium carbonate and sodium sulphate, forming an aqueous solution of said solid mixture and causticizing the sodium carbonate values thereof to form a sulphide-free white liquor, mixing at least part of said sulphide-free white liquor with at least part of the latter aqueous sodium sulphide solution, and utilizing the resulting white liquor as at least part of said pulping liquor.

33. The method of claim 32 wherein said leaching is carried out at a temperature of from about 120° to about 260°F.

34. The method of claim 32 wherein part of said concentrated sodium sulphide solution is recycled as part of said aqueous medium leaching said mass.

35. The method of claim 32 wherein said sodium chloride, sodium carbonate and sodium sulphate are deposited from said sodium sulphide solution as a mixture and said substantially pure sodium chloride is recovered by leaching said latter mixture after separation from the concentrated sodium sulphide solution to provide an aqueous solution of sodium carbonate, sodium sulphate and sodium chloride and a solid mass of substantially pure sodium chloride, and including recycling said aqueous solution of sodium carbonate, sodium sulphate and sodium chloride as part of said aqueous medium leaching said mass.

36. The process of claim 32 including the further steps of subjecting said pulp to a series of bleaching and purification steps using at least one chlorine-containing bleaching chemical in at least one of said bleaching steps and aqueous sodium hydroxide solutions in said purification steps and discharging a sodium chloride-containing aqueous effluent from said series of bleaching and purification steps into said spent pulping liquor to provide at least part of said sodium chloride in said mass.

37. A pulp mill process including the steps of: digesting cellulosic fibrous material with a pulping liquor containing sodium hydroxide and sodium sulphide as the active pulping chemicals to form a pulp and spent pulping liquor, converting said spent pulping liquor into a mass containing sodium sulphide, sodium chloride, sodium carbonate and sodium sulphate, dissolving said mass in an aqueous medium to provide an aqueous solution of the components of said mass, boiling said aqueous solution to deposit therefrom a mixture of sodium carbonate in a substantially anhydrous form and sodium sulphate until said aqueous solution is substantially saturated with respect to sodium chloride thereby avoiding the deposition of all but minor quantities of sodium chloride, removing said deposited mixture from the resulting hot aqueous sodium sulphide solution, cooling said hot aqueous solution to deposit substantially pure sodium chloride therefrom, removing said deposited sodium chloride from the mother liquor, forming an aqueous solution of said deposited and removed mixture and causticizing the sodium carbonate values thereof to form a sulphide-free white liquor, mixing at least part of said sulphide-free white liquor with at least part of said mother liquor, and utilizing the resulting white liquor as at least part of said pulping liquor.

38. The method of claim 37 wherein said boiling is carried out at a temperature of from about 120° to about 280°F.

39. The method of claim 37 wherein said aqueous solution of said components of said mass has a sodium sulphide concentration of about 5 to about 30%.

40. The method of claim 37 including recycling a portion of said mother liquor to said aqueous solution of the components of said mass.

41. The method of claim 37 including boiling the remainder of the mother liquor to deposit a mixture of sodium chloride, sodium sulphate and sodium carbonate, removing the latter mixture from the resulting concentrated sodium sulphide solution and recycling the removed mixture to said mass.

42. The method of claim 37 wherein said latter boiling is carried out at a temperature of from about 120° to about 280°F.

43. The method of claim 42 wherein said mother liquor has a sodium sulphide concentration of about 20 to about 45%.

44. The process of claim 37 including the further steps of subjecting said pulp to a series of bleaching and purification steps using at least one chlorine-containing bleaching chemical in at least one of said bleaching steps and aqueous sodium hydroxide solutions in said purification steps and discharging a sodium chloride-containing aqueous effluent from said series of bleaching and purification steps into said spent pulping liquor to provide at least part of said sodium chloride in said mass.

45. A pulp mill process including the steps of: digesting cellulosic fibrous material with a pulping liquor containing sodium hydroxide and sodium sulphide as the active pulping chemicals to form a pulp and spent pulping liquor, converting said spent pulping liquor into a mass containing sodium sulphide, sodium chloride, sodium carbonate and sodium sulphate, leaching said mass with an aqueous medium to provide a hot aqueous sodium sulphide solution containing said sodium sulphide, said sodium chloride, sodium sulphate and sodium carbonate substantially saturated with respect to sodium chloride and leave a solid mixture of sodium carbonate in a substantially anhydrous form and sodium sulphate substantially free from sodium sulphide and sodium chloride, cooling said hot aqueous solution to deposit substantially pure sodium chloride therefrom, removing said deposited sodium chloride from the mother liquor, forming said solid mixture into an aqueous solution and causticizing the sodium carbonate values thereof to form a sulphide-free white liquor, mixing at least part of said sulphide-free white liquor with at least part of said mother liquor, and utilizing the resulting white liquor as at least part of said pulping liquor.

46. The method of claim 45 wherein said leaching is carried out at a temperature of from about 120° to about 260°F.

47. The method of claim 45 including recycling a portion of said mother liquor as part of said aqueous medium leaching said mass.

48. The method of claim 46 including boiling the remainder of the mother liquor to deposit a mixture of sodium chloride, sodium sulphate and sodium carbonate, removing the latter mixture from the resulting concentrated sodium sulphide solution and recycling the removed mixture to said mass.

49. The method of claim 48 wherein said boiling is carried out at a temperature of from about 120° to about 280°F.

50. The method of claim 49 wherein said concentrated sodium sulphide solution has a sodium sulphide concentration of about 20 to about 45%.

51. The process of claim 45 including the further steps of subjecting said pulp to a series of bleaching and purification steps using at least one chlorine-containing bleaching chemical in at least one of said bleaching steps and aqueous sodium hydroxide solutions in said purification steps and discharging a sodium chloride-containing aqueous effluent from said series of bleaching and purification steps into said spent pulping liquor to provide at least part of said sodium chloride in said mass.

\* \* \* \* \*